United States Patent [19]
Velke et al.

[11] Patent Number: 6,138,446
[45] Date of Patent: Oct. 31, 2000

[54] POWER MOWER WITH RIDING PLATFORM FOR SUPPORTING STANDING OPERATOR DURING OPERATION

[75] Inventors: James D. Velke, Poolesville; William R. Wright, Clarksburg, both of Md.

[73] Assignee: Wright Manufacturing, Inc., Gaithersburg, Md.

[21] Appl. No.: 09/438,317

[22] Filed: Nov. 12, 1999

Related U.S. Application Data

[60] Division of application No. 08/972,395, Nov. 18, 1997, Pat. No. 5,984,031, which is a continuation-in-part of application No. 08/827,455, Mar. 28, 1997, Pat. No. 5,809,755.

[51] Int. Cl.⁷ .................................................. A01D 34/82
[52] U.S. Cl. ........................... 56/202; 56/320.1; 56/320.2
[58] Field of Search ..................... 56/16.7, 11.8, 56/11.6, 17.5, 194, 202, 320.1, 320.2, 14.7

[56] References Cited

U.S. PATENT DOCUMENTS

| | | |
|---|---|---|
| Re. 34,057 | 9/1992 | Middlesworth . |
| 1,764,971 | 6/1930 | Nilson . |
| 2,354,576 | 7/1944 | Clark . |
| 2,583,358 | 1/1952 | Cesan . |
| 3,190,672 | 6/1965 | Swanson et al. . |
| 3,336,042 | 8/1967 | Southall . |
| 3,455,404 | 7/1969 | Hansen . |
| 3,483,682 | 12/1969 | Root . |
| 3,485,314 | 12/1969 | Herr . |
| 3,805,499 | 4/1974 | Woelffer et al. ........................... 56/202 |
| 4,175,762 | 11/1979 | Vaughn et al. . |
| 4,194,345 | 3/1980 | Pioch et al. ........................ 56/320.2 X |
| 4,316,356 | 2/1982 | Planeta . |
| 4,487,006 | 12/1984 | Scag . |
| 4,507,566 | 3/1985 | Leatherman et al. ................. 56/16.7 X |
| 4,558,558 | 12/1985 | Horner, Jr. et al. . |
| 4,709,541 | 12/1987 | Broman et al. . |
| 4,715,168 | 12/1987 | Oxley . |
| 4,787,646 | 11/1988 | Kamlukin et al. . |
| 4,828,282 | 5/1989 | Pinto . |
| 4,874,055 | 10/1989 | Beer . |
| 4,878,339 | 11/1989 | Marier et al. . |
| 4,885,903 | 12/1989 | Scag . |
| 4,920,733 | 5/1990 | Berrios . |
| 4,967,543 | 11/1990 | Scag et al. . |
| 4,991,382 | 2/1991 | Scag . |
| 4,998,948 | 3/1991 | Osterling . |
| 5,004,251 | 4/1991 | Velke et al. . |
| 5,042,238 | 8/1991 | White, III et al. . |
| 5,077,959 | 1/1992 | Wenzel . |
| 5,118,123 | 6/1992 | Betrock . |
| 5,119,619 | 6/1992 | Zappia . |
| 5,131,483 | 7/1992 | Parkes . |
| 5,388,850 | 2/1995 | Simone . |
| 5,413,364 | 5/1995 | Hafendorfer . |
| 5,457,946 | 10/1995 | Deitrick ................................ 56/202 X |
| 5,488,818 | 2/1996 | Powers . |
| 5,491,964 | 2/1996 | Butler ..................................... 56/320.2 |
| 5,507,138 | 4/1996 | Wright et al. . |
| 5,653,466 | 8/1997 | Berrios . |
| 5,809,756 | 9/1998 | Scag et al. . |
| 5,810,106 | 9/1998 | McCoy . |

FOREIGN PATENT DOCUMENTS 597049   4/1993   Japan .

OTHER PUBLICATIONS

Great Dane "Surfer" Yard & Garden, Jan. 1977.
"Cub Cadet Manual" date unknown.
Excel Compacts 251K/251K T/S / 260K T/S (1990).
Excel Hustler 261 (1983).
Excel Hustler 65 and Hustler 36 (1965).

*Primary Examiner*—H. Shackelford
*Attorney, Agent, or Firm*—Nixon & Vanderhye P.C.

[57] ABSTRACT

A zero-turning radius self-propelled power lawn mower includes a standing platform structure for supporting a standing operator during mower operation. The mower has a combination parking brake and pump lockout structure which, when actuated, simultaneously applies a braking force to rear drive wheels and prevents hydro pumps from being moved from their neutral positions. The mower also includes a biasing system for automatically returning hand control levers to their neutral positions when they are not being manipulated by an operator. Unique cutter deck structure, caster structure, grass catcher structure, and steering control levers are also provided.

4 Claims, 21 Drawing Sheets

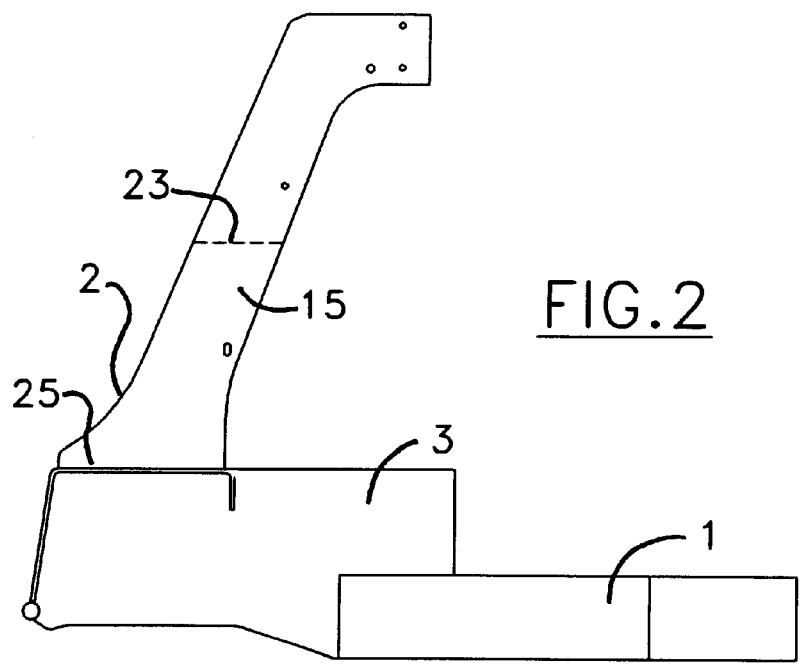
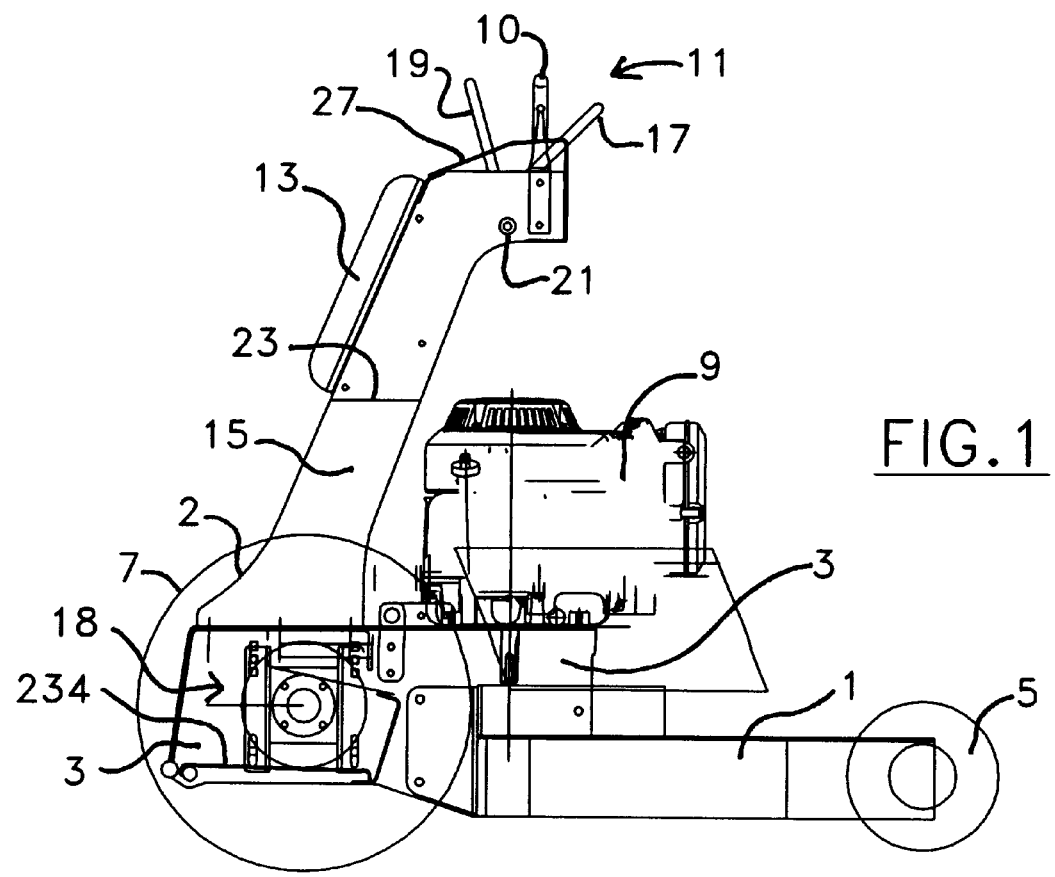

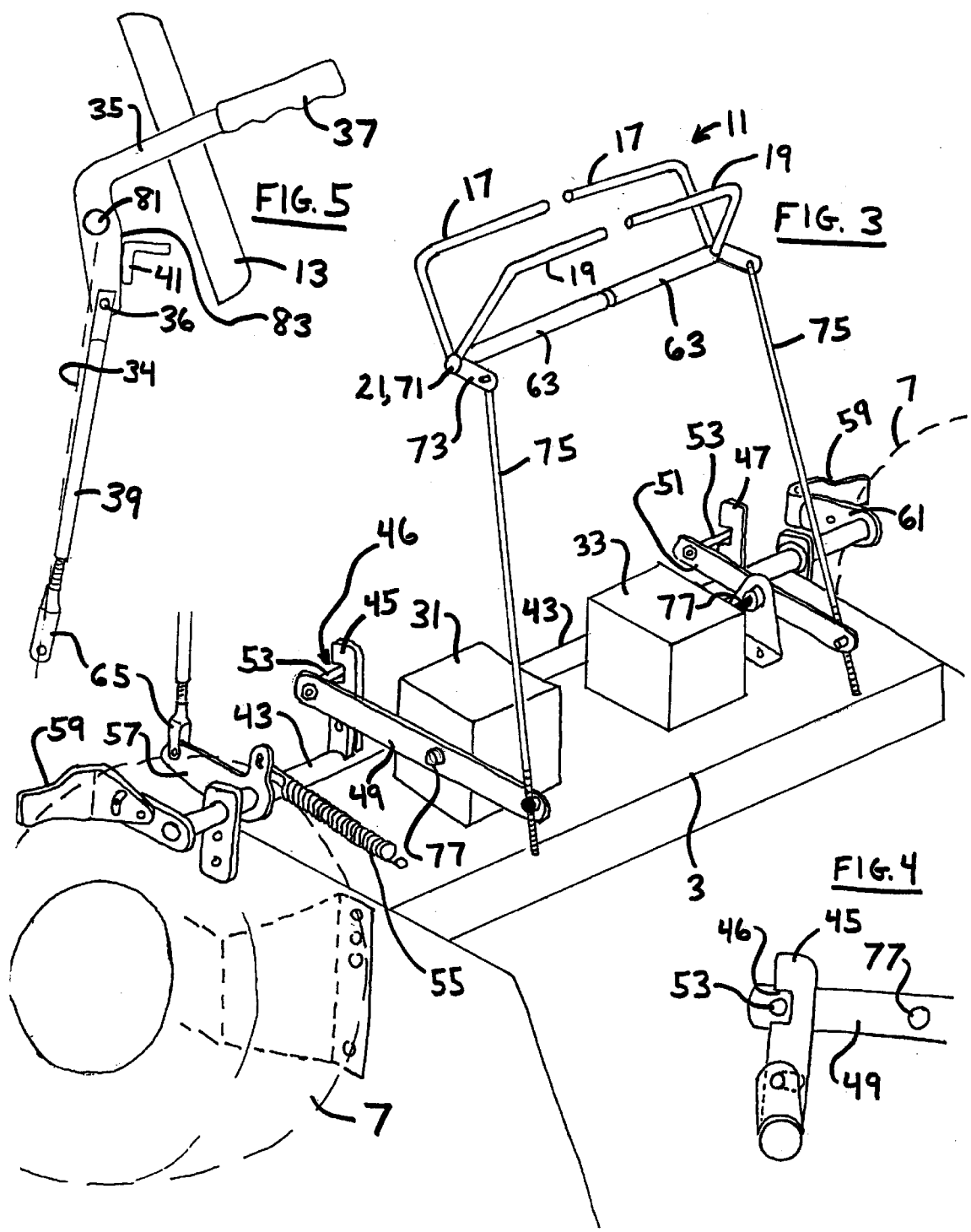

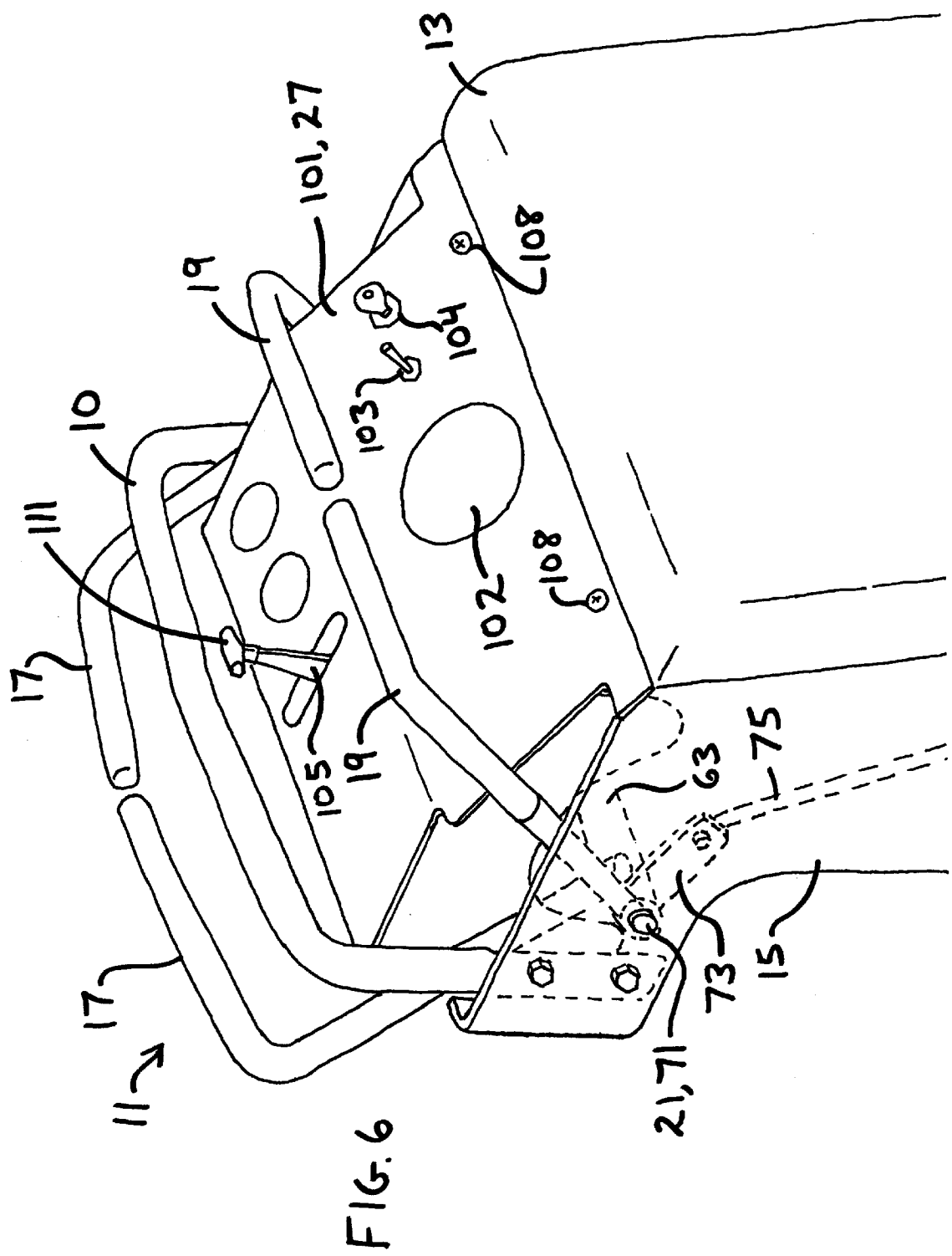

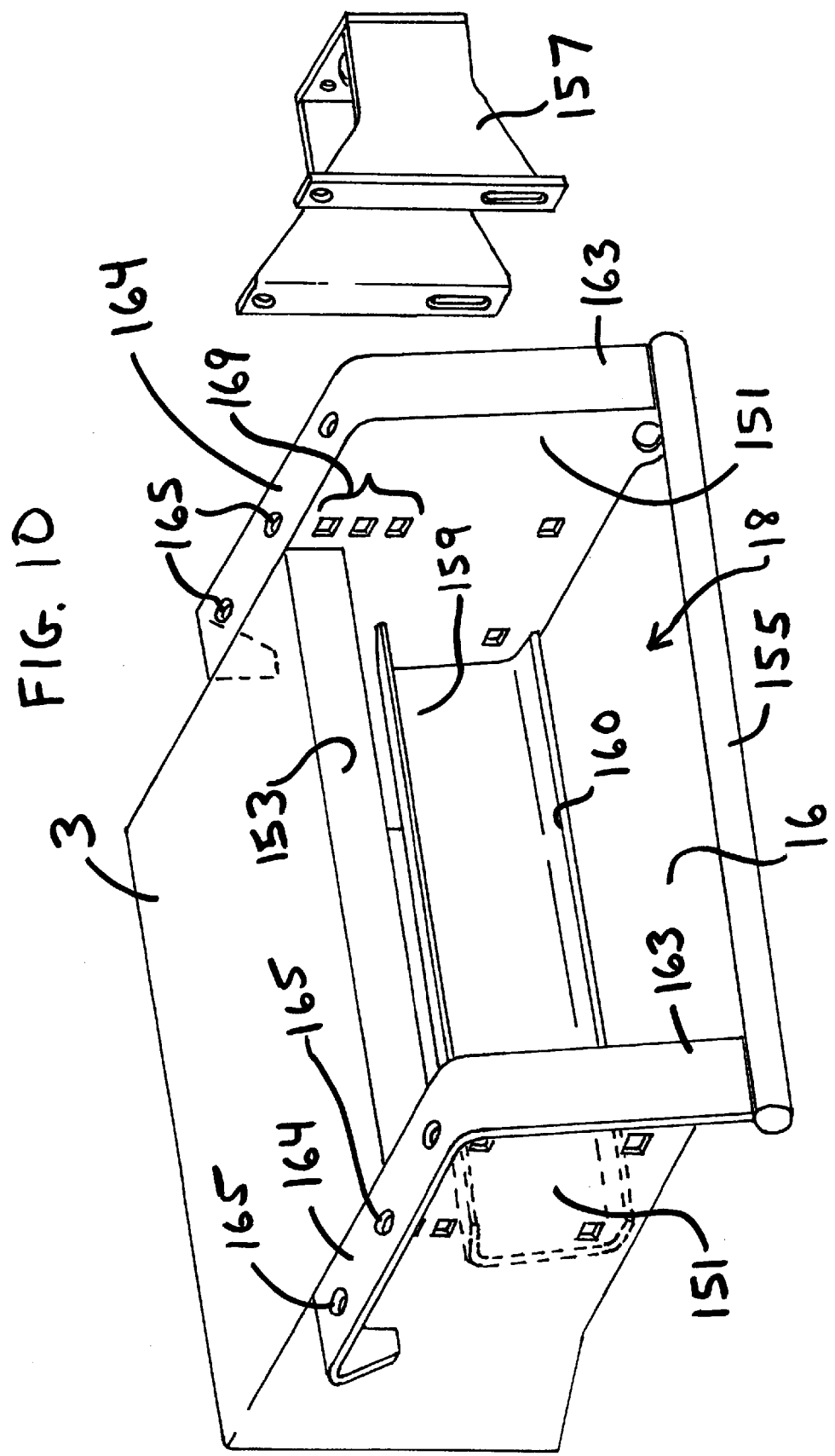

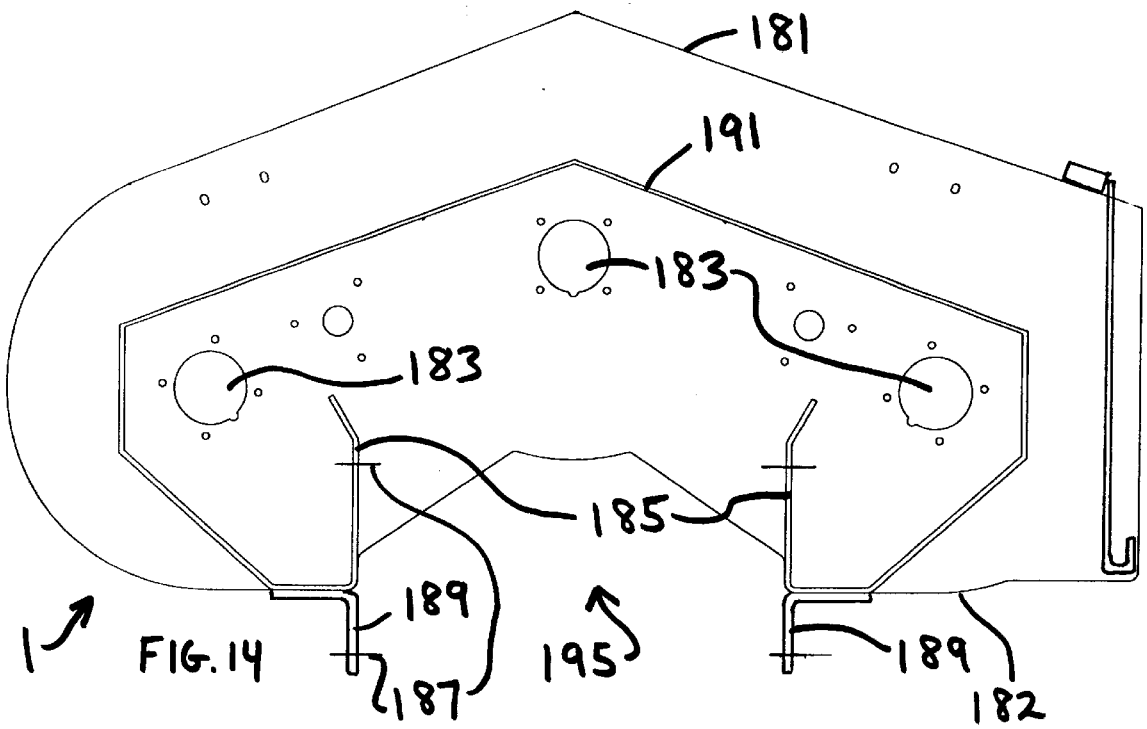
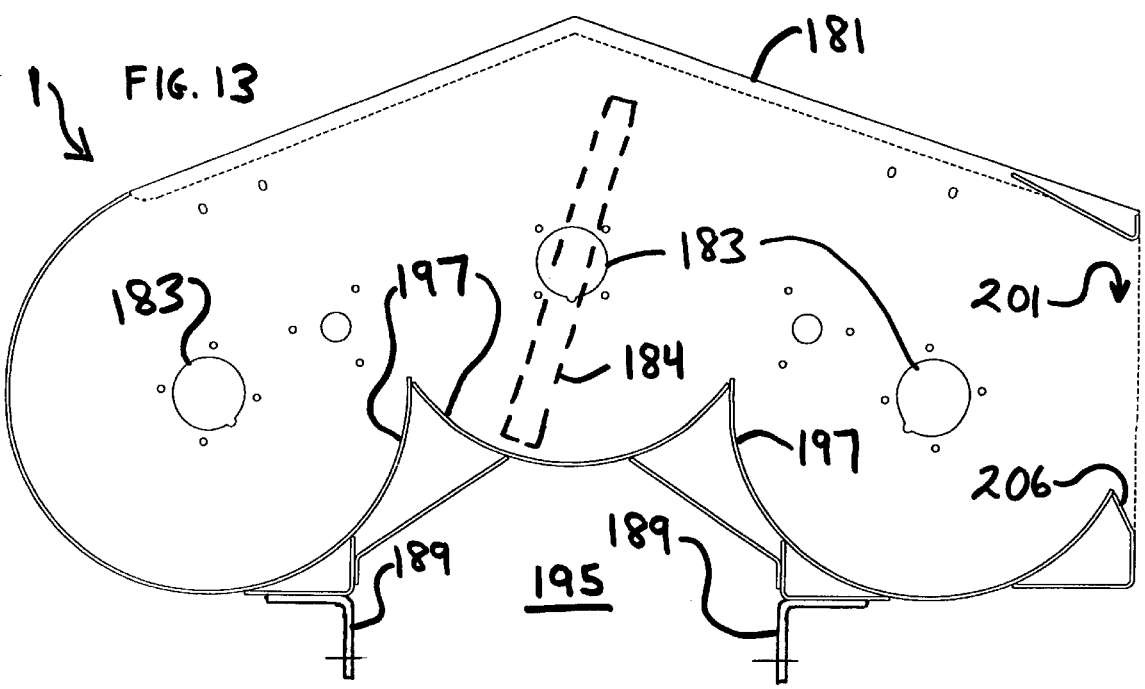

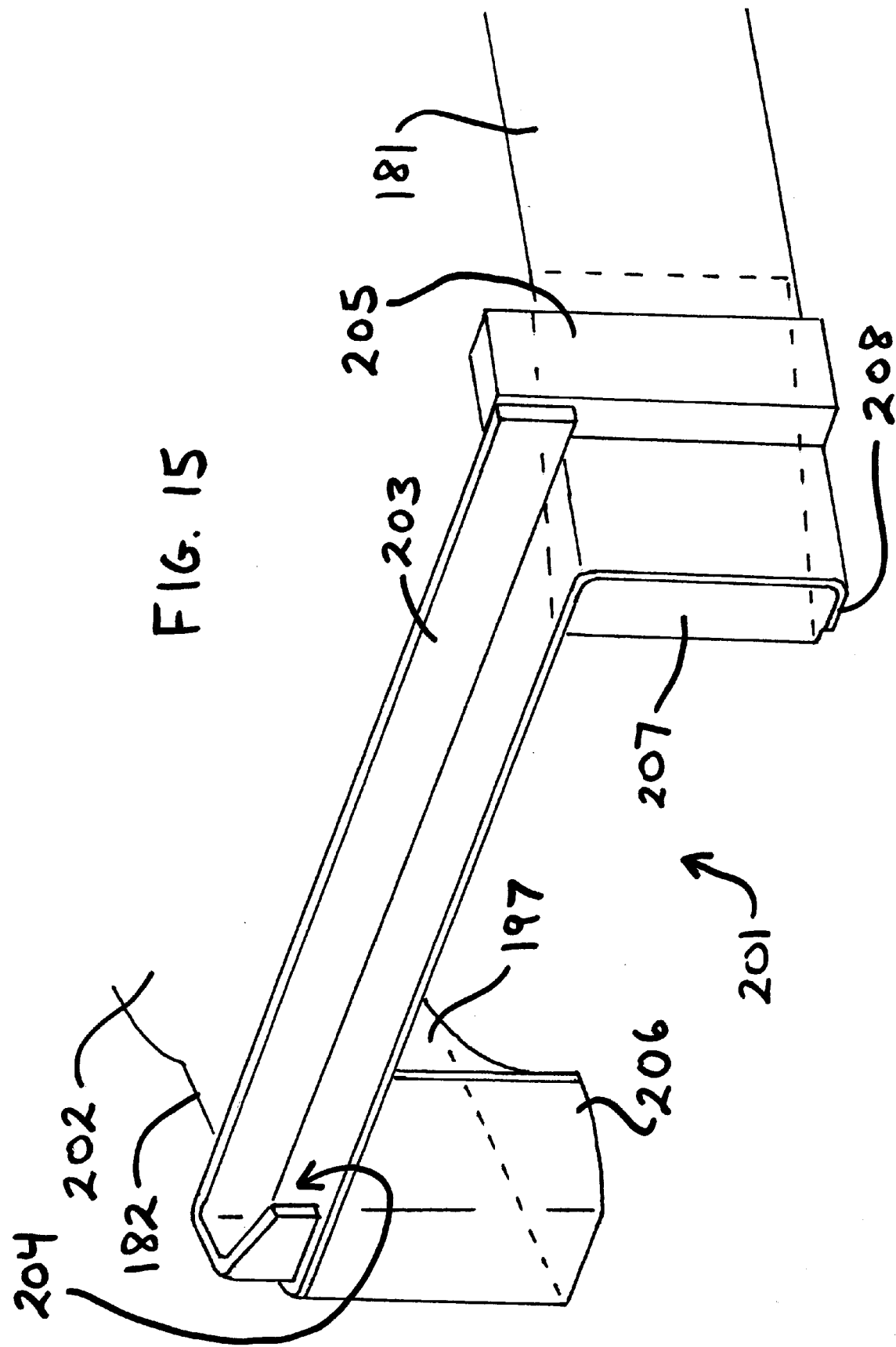

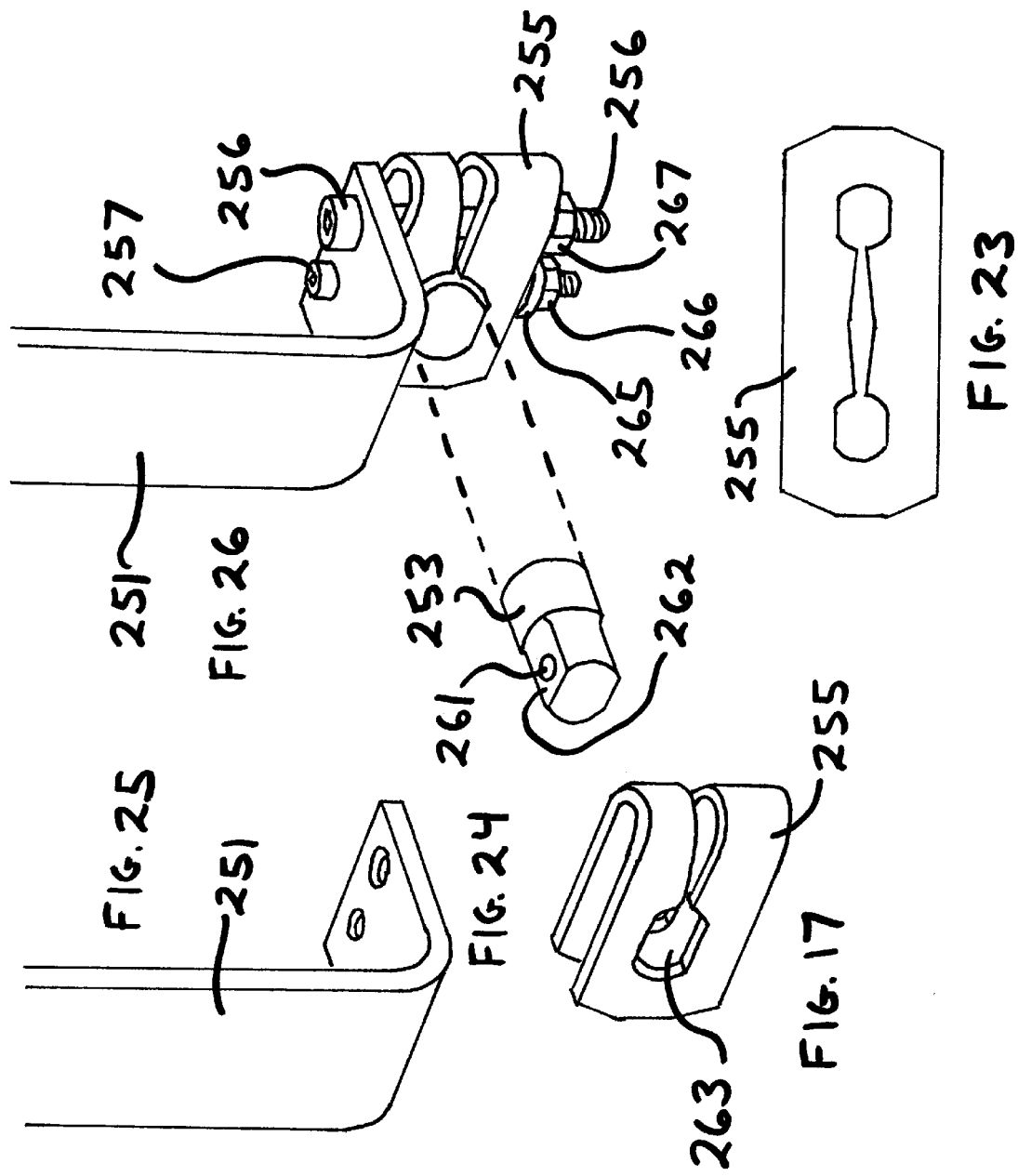

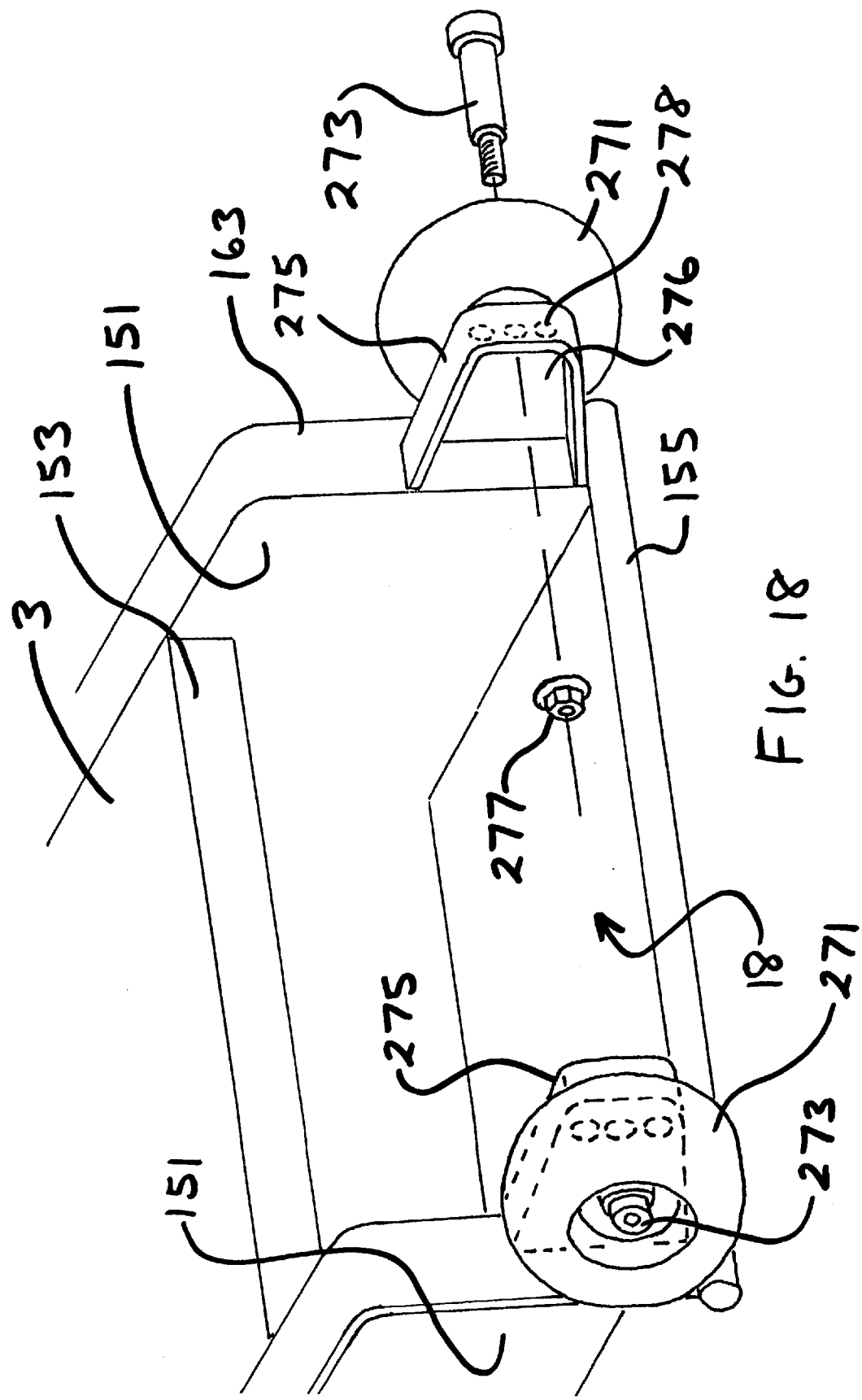

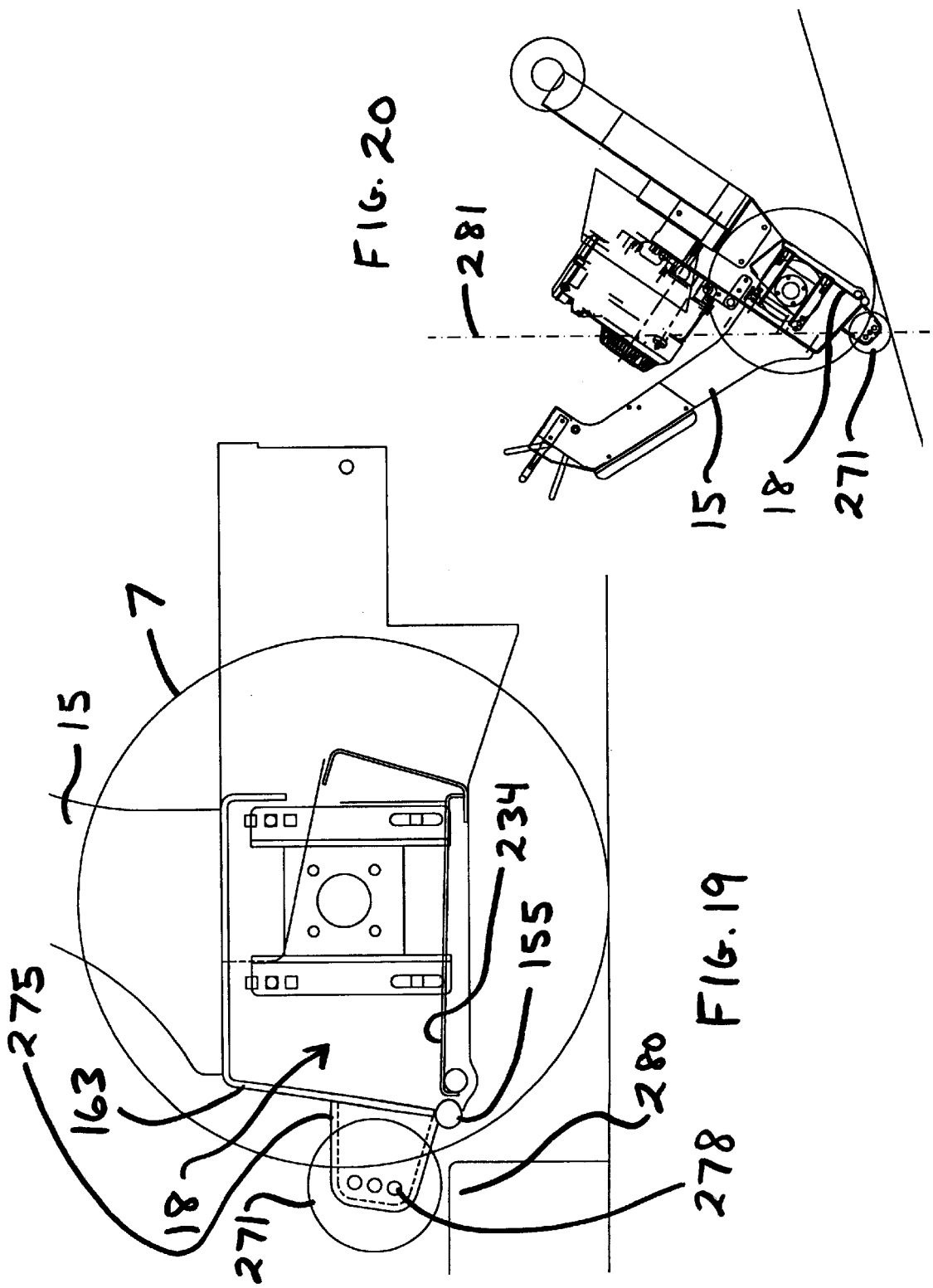

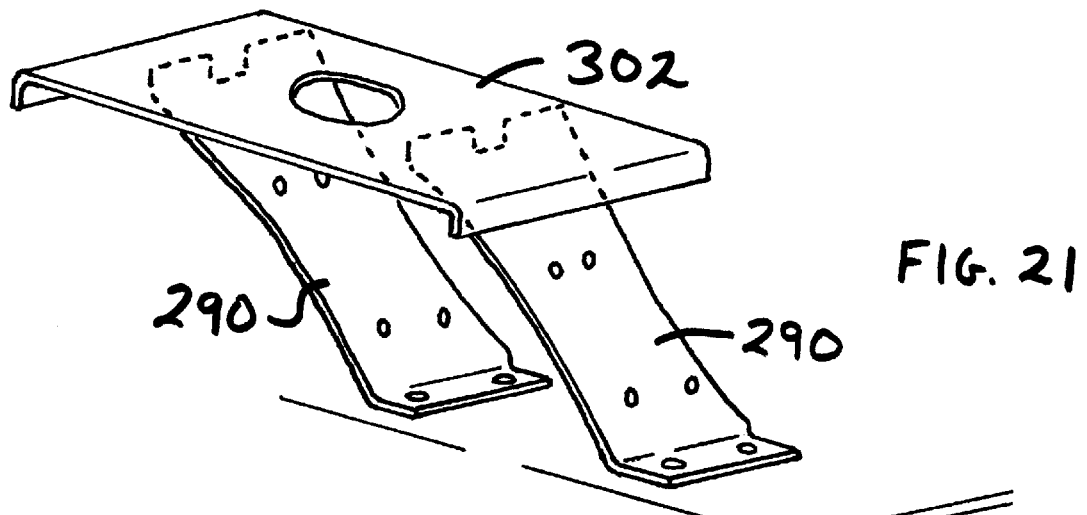
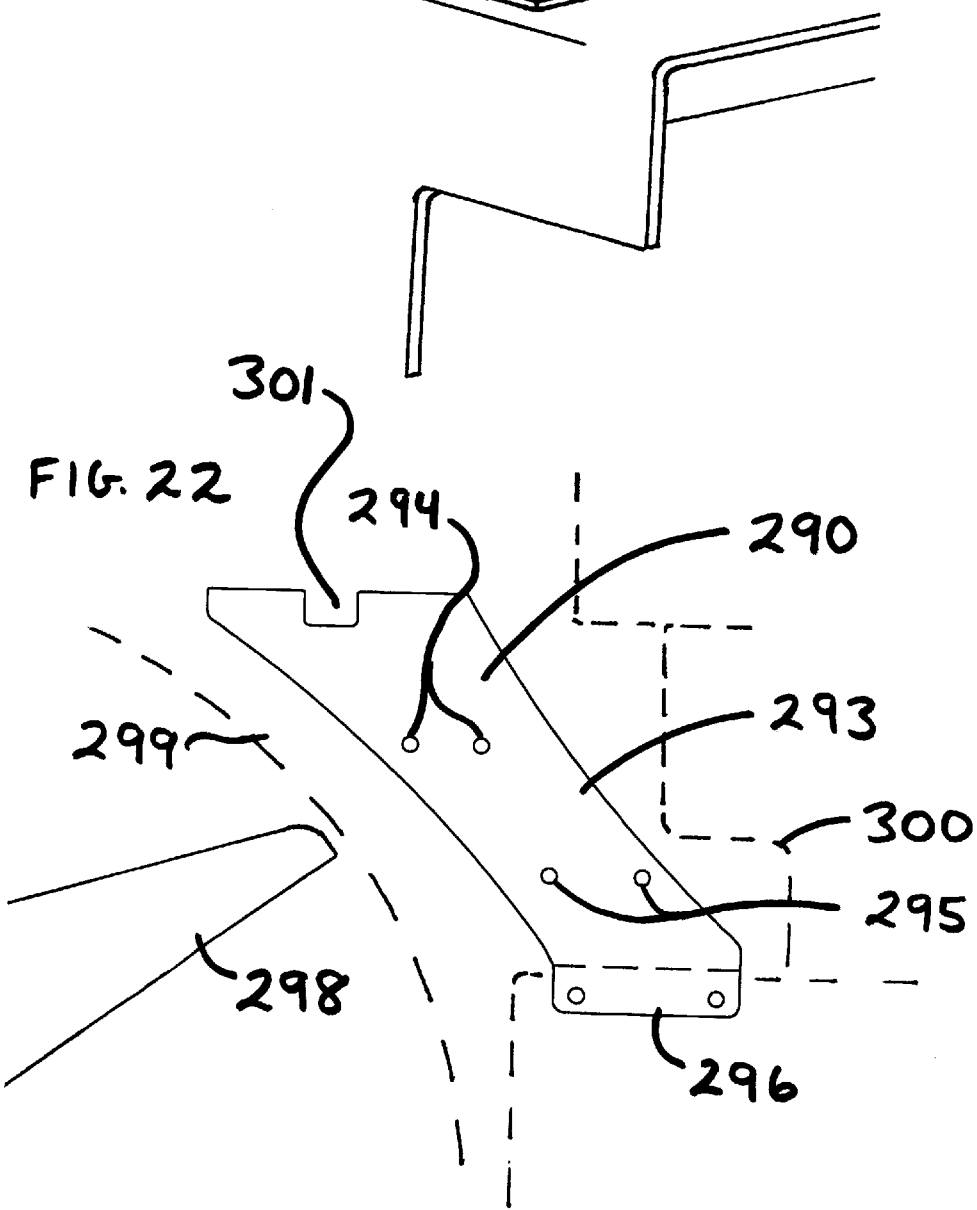

POWER MOWER WITH RIDING PLATFORM FOR SUPPORTING STANDING OPERATOR DURING OPERATION

RELATED APPLICATIONS

This application is a divisional of U.S. Ser. No. 08/972,395, filed Nov. 18, 1997 (now U.S. Pat. No. 5,984,031), which is a continuation-in-part of U.S. Ser. No. 08/827,455, filed Mar. 28, 1997 (now U.S. Pat. No. 5,809,755), the disclosures of which are hereby incorporated herein by reference.

This application is related to commonly owned U.S. Pat. No. 5,600,944; U.S. Pat. No. 5,507,138; and Ser. No. 08/932,932, the disclosures of which are hereby incorporated herein by reference.

This invention relates to a power driven device. More particularly, this invention relates to a zero-turning radius power lawn mower including a riding platform for supporting a standing operator.

BACKGROUND OF THE INVENTION

Conventional hydraulically driven (i.e. hydrostatically controlled) machines such as power lawn mowers include a pair of drive wheels, each of which is independently operated by a hydraulic (i.e. hydrostatic) pump coupled to the mower's engine. A corresponding motor is provided for each drive wheel, each motor being powered and controlled by one of the pumps. Each pump includes a control lever for regulating fluid pressure and direction to its corresponding motor so that the drive wheels can be independently controlled so that each may be rotated at variable speeds in both forward and reverse directions. In this manner, the mower may be steered by controlling the speed and direction of the two drive wheels. This type of design is found in the mower inventions herein.

In certain of the above-identified mowers and in the instant inventions, it is possible to operate one of the drive wheels at a predetermined speed in a first direction and the other drive wheel at the same speed in the opposite direction, thereby enabling the operator to conduct zero-radius turns of the mower. This, of course, provides for improved maneuverability in tight environments. Exemplary zero-radius turning mowers are disclosed in commonly owned U.S. Pat. Nos. 5,507,138 and 5,600,944.

Conventional power mowers are generally divided into three separate categories: (i) self-propelled walk behind mowers; (ii) mowers operated by a seated occupant; and (iii) mowers operated by a standing operator. Walk behind mowers and mowers operated by seated occupants have a number of disadvantages, some of which are discussed in the background section of the parent application, and in the background sections of the above-identified U.S. Pat. Nos. 5,507,138 and 5,600,944, each of which is incorporated herein by reference.

Unfortunately, known prior art mowers which have a platform for supporting a standing operator, such as that disclosed in U.S. Pat. No. 4,878,339, have a number of disadvantages. These include inefficient design, overly complicated design and equipment, the utilization of parts which are not efficiently manufacturable or easily assembled in mass production environments, etc.

It is apparent from the above that there exists a need in the art for a power lawn mower operable by a standing occupant including an efficient and operator-friendly design, and parts therefor which are efficient, easily made, cost-effective, and the like. Each of the above-identified advantages is accomplished herein.

It is a purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a zero-turning radius power lawn mower for operation by a standing occupant, the mower comprising:

an engine for driving at least one cutting blade;

first and second drive wheels whose drive direction and speed are controlled by first and second pumps, respectively;

a brake lever that may be actuated in order to apply a braking effect or force to the mower; and a pump lockout system that is engaged to prevent the first and second pumps from being changed from a neutral state, the pump lockout system being engaged along with the braking force when an occupant or operator actuates the brake lever.

In certain preferred embodiments, the mower includes a standing platform for supporting the standing occupant, the platform being located relative to a handle member (which is positioned forward of the zero-radius turning axis) so that a substantial portion of the occupant's body may be located a zero-radius turning axis or point of the mower during zero-radius turns thereof so that the occupant is substantially unaffected by centrifugal force created during zero-radius turns of the mower.

This invention further fulfills the above-described needs in the art by providing a zero-radius turning mower comprising:

first and second drive wheels;

a steering control assembly for controlling steering of the mower, the steering control assembly including a rigid bar for supporting hands of the operator during mower operation, first and second pivotable control levers positioned on one side of the rigid bar for selectively controlling reverse speed of the first and second drive wheels respectively, wherein each of the first and second control levers is adapted to be pivoted toward the rigid bar in order to cause a corresponding one of the drive wheels to move in a reverse direction; and the steering control assembly further including third and fourth pivotable control levers positioned on the other side of the rigid bar so that the rigid bar is disposed between (i) the first and second control levers; and (ii) the third and fourth control levers; and wherein the first and fourth control levers are each adapted to be pivoted toward the rigid bar in order to cause a corresponding drive wheel to be driven in a forward direction.

In certain preferred embodiments, the first, second, third, and fourth levers are pivotable about a common pivot axis.

This invention further fulfills the above-described needs in the art by providing a self-propelled power lawn mower for operation by a standing operator, the mower comprising:

a platform structure for supporting the standing operator during mower operation, the platform structure being at least partially located between first and second rear drive wheels of the mower; and wherein the platform structure includes a bottom surface for supporting the operator, first and second sidewalls connected to the bottom surface for shielding the operator's feet from the wheels, and an overhang.

portion connected to the sidewalls which at least partially overhangs the bottom surface so as to be disposed between an engine and the operator's feet.

This invention will now be described with respect to certain embodiments thereof, accompanied by certain illustrations, wherein:

IN THE DRAWINGS

FIG. 1 is a side elevational view of a stand-on zero-radius turning mower according to an embodiment of this invention.

FIG. 2 is a side elevational view of the handle mechanism support assembly, engine deck, and separate and independent cutter deck of the FIG. 1 embodiment.

FIG. 3 is a perspective view of a parking brake control system adapted for use in the FIGS. 1–2 mower, according to certain embodiments of this invention.

FIG. 4 is a side partial cross-sectional view of a pivoting pump control lever and notched locking tab of the FIG. 3 structure.

FIG. 5 is an exploded elevational view of the brake lever assembly of the FIGS. 3–4 structure.

FIG. 6 is a perspective view illustrating the upper portion of the handle mechanism control assembly according to an embodiment of this invention adapted to be used in conjunction with the mowers of all embodiments herein.

FIG. 10 is a partially exploded elevational view of the engine deck structure for supporting wheel motors, handle bar assembly, and operator support platform structure according to an embodiment of this invention, this structure adapted to be-used in conjunction with the mower of FIGS. 1–9 and all embodiments herein.

FIG. 13 is a top transparent view of the cutter deck of FIGS. 11–12, looking through the top surface of the deck to show the components underneath the deck's top surface.

FIG. 14 is a top elevational view of the cutter deck of FIGS. 11–13, this cutter deck adapted to be used in conjunction with any of the mowers herein.

FIG. 15 is a perspective view of the side discharge opening structure of the cutter deck of FIGS. 11–14.

FIG. 17 is a perspective view of a pump clamp, after it has been bent about its center area, this clamp operatively associated with the structure of FIGS. 23–26.

FIG. 18 is a perspective view of a pair of anti-wheelie wheels located adjacent the rear of the mower for anti-tip-over purposes, this structure adapted to be used in conjunction with the mower of FIGS. 1–17 herein and all embodiments herein.

FIG. 19 is a partial side elevational view of the anti-wheelie structure of FIG. 18 on the FIGS. 1–17 mower, including the mower's wheel and handle support assembly portions.

FIG. 20 is a side elevational view illustrating the anti-tipping structure of FIGS. 18–19 on the FIGS. 1–19 mower, this figure showing how the anti-wheelie structure prevents backward tipping (i.e. wheelies) over of the mower of FIGS. 1–19 herein.

FIG. 21 is a perspective view of a fuel tank support bracket according to certain embodiments of this invention, this bracket adapted to be used in conjunction with the mower of FIGS. 1–20 and all embodiments herein.

FIG. 22 illustrates the not-yet-bent bracket of FIG. 21, in a side view manner mounted to the engine deck, this bracket also useable in a singular manner to support a battery mounting plate in certain embodiments. The shape of this support is advantageous in that it is shaped to mount to the top of the engine deck and clear the chute path.

FIG. 23 is a side elevation view of the clamp of FIG. 17 in its manufacturing process, before it is bent (i.e. prior to forming of the FIG. 17 bent structure).

FIG. 24 is a perspective view of a pump shaft operatively associated with the FIG. 17 and FIG. 23 clamp, the shaft portion shown in FIG. 24 operatively associated with the FIG. 26 structure as shown.

FIG. 25 is a perspective view of control linkage coupled to the clamp of FIGS. 17, 23, and 24.

FIG. 26 is a perspective view illustrating the overall pump clamp and lever assembly including the components of FIGS. 17 and 23–25, this assembly to be used in conjunction with the mower of the different embodiments herein.

DETAILED DESCRIPTION OF CERTAIN EMBODIMENTS IN THIS INVENTION

Figure 7:
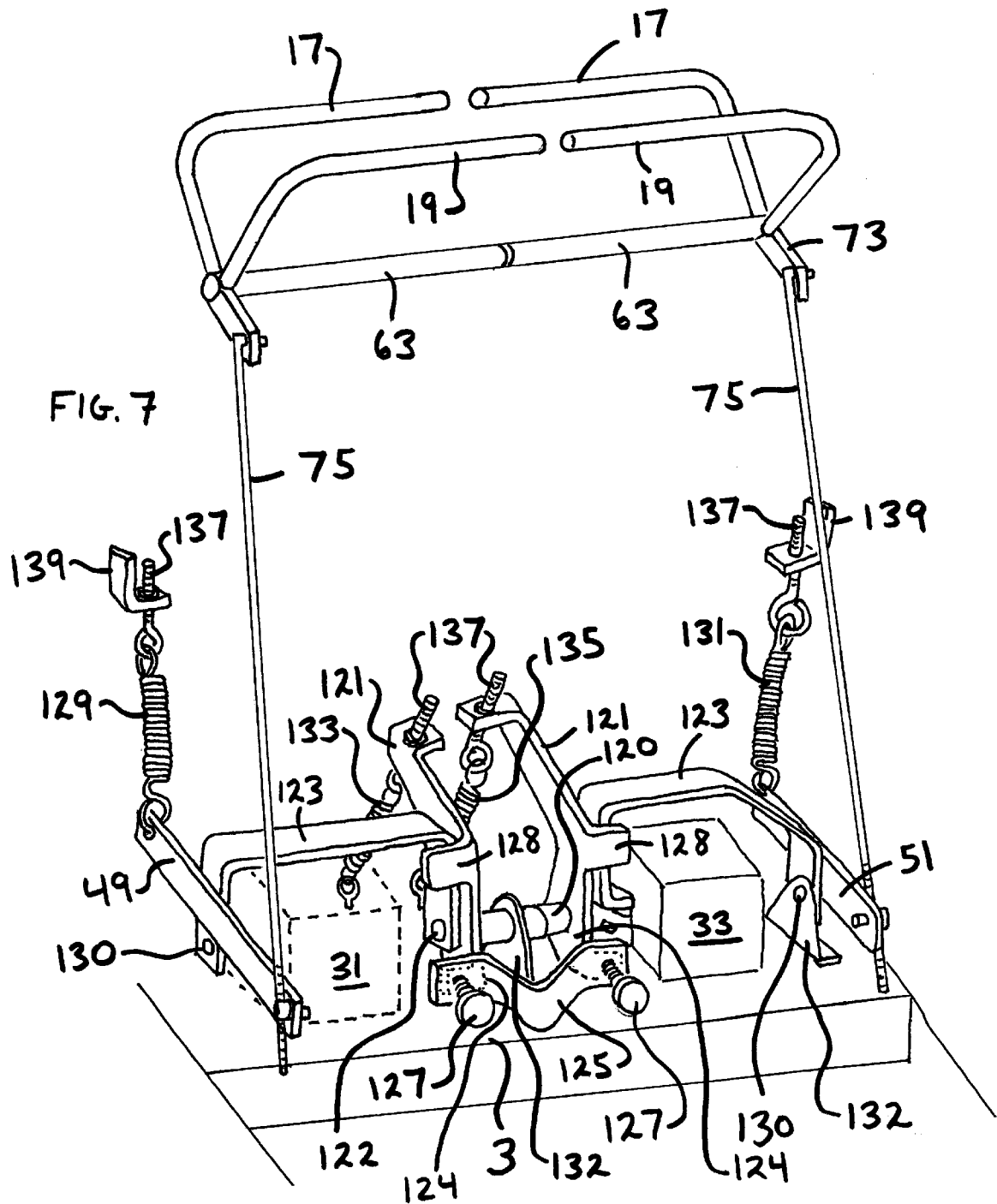
FIG. 7 is a perspective view of an automatic neutral control return system according to an embodiment of this invention, this system adapted to be used in combination with the mower of FIGS. 1–6 and all embodiments herein.

Referring now more particularly to the accompanying drawings in which like reference numerals indicate like parts throughout the several views herein.

FIG. 1 is a side elevational view of a zero-turning radius stand-on mower according to certain embodiments of this invention, this mower including a foot platform support structure 18 for supporting a standing (at least substantially upright) operator during operation of the mower. Structure 18 supports an operator supporting metal perforated sheet 234 upon which the operation stands, sheet 234 being part of structure 18. FIG. 2 shows only the cutter deck, engine deck, and a handle support of the FIG. 1 mower. The mower's handle bar 10 and hand-control mechanism and steering control levers 17 and 19 are located forward of the zero-radius turning axis and are thus positioned so that the standing occupant can at least be partially positioned at the zero radius turning axis or point (between the rear drive wheels) during zero-radius turns of the mower so that the operator is substantially unaffected by centrifugal force created during such zero radius turns when the rear drive wheels 7 are operated at substantially the same speed in opposite directions.

The FIGS. 1–2 mower includes cutter deck 1, engine deck 3, (the mower and cutter decks are separate deck structures for performing different functions), a pair of front caster wheels 5, a pair of rear drive wheels 7, engine 9 mounted on engine deck 3, handle control assembly 11 for allowing the operator to control the rotation drive speed and direction of the rear drive wheels 7, thigh pad 13 for enabling the operator to rest his/her thighs thereon during operation, support assembly 15 extending upwardly at an angle from engine deck 3 so as to support thigh pad 13 and handle control assembly 11 (this support assembly includes first and second upwardly extending supports 15 located on opposite sides of the operator support platform), and cutting blades positioned beneath cutting deck 1 (the cutting blades are driven by engine 9). The tops of supports 15 bend such that they curve over top of the engine and the like.

Handle control assembly 11 includes rigid handle bar 10 fixedly attached to supports 15, reverse control levers 17, and forward control levers 19. Control levers 17 and 19 are pivotally affixed to supports 15 about axis 21 so that the standing operator can control the steering of the mower via the rear drive wheels 7 by pivoting levers 17 and/or 19 during operation. There are two separate reverse control levers 17 (one corresponding to each rear drive wheel 7) and two separate forward control levers 19 (one corresponding to each rear drive wheel 7).

During operation, the operator stands on the pivotal platform sheet 234 of operator support platform structure 18 and holds onto rigid non-pivoting handle bar 10 for support during mower operation. In order to cause a particular rear drive wheel 7 to be driven in a reverse direction, the operator simply pulls the reverse control lever 17 corresponding to the wheel to be controlled backward so that lever 17 pivots about axis 21, and the degree to which the lever 17 is pivoted backward toward bar 10 dictates and determines the speed of the rear drive wheel 7 being controlled. In a similar manner, in order to cause one of wheels 7 to be driven in a forward direction, the operator moves or pivots the forward control lever 19 corresponding to that particular drive wheel in a forward direction toward rigid bar 10, and the degree/distance to which the lever 19 is moved dictates or determines the forward speed of the wheel 7 being controlled. In order to cause the mower to move in a straight forward direction for example, the operator pivots both levers 19 forward toward bar 10 a substantially equal amount/distance. In order to cause the mower to move straight backward the operator would pull both reverse levers 17 backward toward bar 10 in substantially equal amounts. The mower is turned by the operator by causing the rear drive wheels 7 to rotate at different speeds in the same or opposite direction, or at the same speed in opposite directions. For example, when the mower is moving in a forward direction the operator may turn slightly to the right by pushing both levers 19 forward toward bar 10, but pushing the left hand lever 19 further forward than the right hand lever 19 so that the left rear drive wheel 7 is driven at a faster forward speed than the right hand rear drive wheel 7. For zero-radius turns about a pivot axis located between the two rear drive wheels 7, the reverse lever 17 corresponding to one wheel 7 is pulled backward a predetermined amount and the forward lever 19 corresponding to the other wheel 7 is pushed forward substantially the same predetermined amount so that the two drive wheels 7 rotate at substantially the same speed in opposite directions.

It is noted that each support member 15 includes a central bend 23 located proximate a central area thereof, and another lower bend 25 provided at the bottom of support 15 for the purpose of allowing the support 15 to be bolted or otherwise affixed to a top surface of engine deck 3. The control assembly 11 also includes dash panel or dashboard 27.

FIGS. 3–5 illustrate a parking brake and pump control lockout control system according to an embodiment of this invention. The FIGS. 3–5 system is, of course, adapted to be used in conjunction with the mower of FIGS. 1–2. The system can be actuated when the mower is in neutral (i.e. when steering control levers 17 and 19 are not being touched by the operator and are thus biased into their respective neutral positions), and when this system is actuated pins 53 become locked in recesses or cutouts 46 defined in locking lever members 45 and 47 respectively so that pump control levers 49 (e.g. lever for controlling left-hand pump) and 51 (e.g. lever for controlling right hand pump) and elongated rod 43 are locked in place and parking brake shoes 59 engage the tires of wheels 7. Thus, when the lockout and brake system is actuated, simultaneously (i) the parking brake is set on the mower, and (ii) levers 17 and 19 cannot be moved and therefor pumps 31 and 33 cannot be adjusted from their neutral positions.

FIGS. 3–5 illustrate the lockout system in an actuated (or locked) position when parking brake lever 35 (see FIG. 5) has been pulled upward by an operator, with FIG. 3 illustrating the system generally except for parking brake lever 35, its handle 37, and stop member 41 which are shown in FIG. 5 (FIG. 3 does not illustrate lever 35 for purposes of simplicity). FIG. 4 is a close-up view showing how a pin 53 becomes locked in a cutout 46 when the brake and lockout system is actuated.

As illustrated in FIGS. 3–5, the parking brake and pump control lockout system includes hydraulic/hydrostatic pump 31 for controlling the direction and speed of one (e.g. left) rear drive wheel 7, hydraulic/hydrostatic pump 33 for controlling the direction and speed of the other (e.g. right) rear drive wheel 7, handle control assembly 11 including reverse control levers 17 and forward control levers 19, substantially L-shaped parking brake control lever 35 and corresponding handle 37 portion (see FIG. 5), push rod 39 pivotally affixed to brake lever 35 at pivot axis 36, stop member 41 rigidly mounted to the mower (see FIG. 5), thigh pad 13 (see FIG. 5), engine base or deck 3, rigid rotatable bar 43 mounted on top of the engine deck and adapted to rotate about its elongated axis, locking lever members 45 and 47, pivoting pump control levers 49 and 51, elongated pin members 53 which are affixed to levers 49 and 51 respectively and which are adapted to operatively lock or fit into the respective cutouts or recesses 46 defined in members 45 and 47, spring 55 for biasing rod 43 and member 57 about their common pivot or rotation axis into a non-actuated position, brake shoes 59 for operatively braking the tires of wheels 7, brake shoe supporting members 61 for coupling shoes 59 to rod 43, elongated support members 63 extending between the pair of supports 15 for pivotally supporting the handle assembly, steering control rods 75, and rod connecting member or yoke 65 pivotally connecting brake/lockout pushrod 39 to member 57. There are two commonly aligned members 63, one corresponding to each set of levers for each drive wheel. Yoke 65 is threadedly coupled to pushrod 39 at one end thereof in a non-pivoting manner, and is pivotally attached to member 57 at its other end so that vertical movement of pushrod 39 causes member 57 and rod 43 to rotate together about their common elongated axis.

Still referring to FIGS. 3–5, the operator can manipulate the speed and direction of rear drive wheels 7 by moving control levers 17 and 19. For example, when a reverse control lever 17 is pulled backward by the operator, it pivots about axis 21, 71 which causes a member 73 to cause a steering control rod 75 to move downward. When rod 75 moves downward as a result of its corresponding lever 17 being pulled backward, this causes the corresponding pump control lever 49 to pivot in a clockwise direction (relative to the FIG. 3 illustration) about pump shaft axis 77 thereby controlling the pump at issue so that the pump causes the wheel 7 being controlled to rotate in a reverse direction at a speed dictated by the amount the lever 17 was pulled backward. Meanwhile, when either of forward control levers 19 is pushed forward by the operator, this causes the corresponding rod 75 to move vertically upward thereby causing the lever 49 being manipulated to rotate counterclockwise about its axis 77 so that the pump at issue causes the corresponding wheel 7 to rotate forward at a speed dictated by the amount the lever 19 was moved forward. Depending upon the direction and degree of rotation of axis/rod 77, pump 31/33 is controlled so as to manipulate the direction and speed of the corresponding drive wheel 7. It is noted that the mower is in "neutral" when none of levers 17 and 19 are pushed or pulled by the operator.

The parking brake and pump lockout system of FIGS. 3–5 is actuated when the operator pulls handle 37 upward to the position shown in FIG. 5. However, spring 55 biases member 57 and rod 43 to a non-actuated position, so that when handle 37 is not pulled, rod 43 is biased by spring 55 to rotate backward in a clockwise direction (relative to the FIG. 3 illustration) about its axis so that locking levers 45 and 47 are substantially spaced from pins 53 and the lockout system cannot become engaged. When the operator pulls handle 37 to actuate the system, this causes rod 43 to rotate counterclockwise toward pins 53 against the biasing force of spring 55, and the lockout system can be engaged when the mower is in neutral and the position of pins 53 is such that they slide into (i.e. become engaged with) cutouts or recesses 46. The parking brake and pump lockout system can only be actuated or engaged when the mower is in neutral because this is the only time when the position of pins 53 corresponds to the position of cutouts 46 when handle 37 is pulled upward.

FIG. 4 is a side partial cross-sectional view illustrating in an enlarged manner how an elongated pin or bar 53 which is attached to a pump control lever 49 can become locked in locking member 45 so as to lock brake shoes 59 in place against wheels 7 so as to actuate the parking brake, and lock out control of movement of levers 49 and thus control of pumps 31 and 33. Referring to FIG. 5, in order to actuate the parking brake and pump lockout system, when the mower is in neutral the operator pulls lever 35 upward via handle member 37 so that lever 35 pivots about axis 81 in a counterclockwise direction. As a result of this counterclockwise pivoting of lever 35, pushrod 39 is moved vertically downward until the bottom side or surface 83 of lever 35 comes to rest against stop 41 (see FIG. 5). When bottom surface 83 of lever 35 comes to rest against stop 41, pushrod 39 has been pushed downward thereby causing pivoting member/lever 57 to rotate counterclockwise along with rod 43 to which it is rigidly affixed so as to pivot locking members 45 and 47 counterclockwise so that locking cutouts 46 slide around and become engaged with pins 53. When pins 53 are engaged in the cutouts or recesses 46 in locking members 45 and 47 respectively, this prevents pump control levers/arms 49, and control levers 17 and 19 from moving thereby keeping the mower in neutral until handle 37 is pushed downward by the operator to deactuate or disengage the parking brake and pump lockout system. At the same time that rod 43 rotates counterclockwise when brake handle 37 is pulled to actuate the system, this also causes members 61 to pivot counterclockwise with rod 43 about their common axis which in turn forces the corresponding brake shoes 59 into engagement with the tires of wheels 7 so as to engage the parking brake. The combination parking brake/pump control lockout system is disengaged simply by pushing handle 37 downward so as to cause surface 83 to become disengaged with stop 41 which allows rod 39 to move upward and spring 55 to bias rod 43 and members 45 into disengaged positions remote from pins 53. Spring 55 also biases shoes 59 out of contact with the tires.

Another nice aspect of this invention is that the "actuated" position that handle 37 assumes when the parking brake is on (and pump lockout is in effect) is one such that handle 37 extends outwardly rather far from thigh rest 13 and is easily visible to any operator. When the center of rod 39 or pivot 36 passes beyond center line 34 defined between axis 81 and the pivot of member 65, then this locks the lever 35 in a brake position as rod 39 is forced or biased upward due to tension by spring 55 and/or the effect of the tires against shoes 59. Thus, one can tell from a far distance from the mower whether the pumps 31 and 33 are locked out and the parking brake is on. When the parking brake is off, and pins 53 disengaged from cutouts 46, handle 37 is at a position rotated clockwise relative to its FIG. 5 position so that handle 37 is substantially parallel to pad or rest 13 and does not stick outwardly from rest 13 and thereby does not inhibit movement of the operator during mower operation.

FIG. 6 is a perspective of the dash panel of the FIGS. 1–5 mower according to certain embodiments of this invention. As illustrated, the handle control assembly 11 includes rigid handle bar 10 which is affixed at both ends thereof to corresponding supports 15 in a non-moving manner, and control levers 17 and 19 described above. As will be appreciated, there are two each of control levers 17 and 19, so that the right-hand lever 17 controls reverse movement of the right rear drive wheel while the left-hand lever 17 controls the reverse movement of the left rear drive wheel. The same is the case with the two separate and independent forward control levers 19. Also illustrated in FIG. 6 are dash panel 27, 101 which is supported and rigidly affixed to cross member 141 on supports 15, aperture or hole 102 allows an operator to access the oil tank and fill same, clutch switch 103, key switch 104, throttle control 105 which may be operated by either hand of the operator without the operator needing, to remove his hands from supporting handle bar 10, hour meter 106, ammeter 107, dashboard mounting screws 108, thigh pad or rest 13, lever control axis 21, 71 about which levers 17 and 19 pivot, pivot member 73 for coupling levers 17 and 19 to control rods 75, and throttle control knob 111. This dashboard assembly has been specifically designed by the instant inventors so as to be user friendly and safe. This design allows the operator to always have the ability to keep both hands on bar 10 during actual mower operation regardless of whether the mower is being turned, or being driven in forward or reverse. Levers 17 and 19 are positioned on either side of bar 10 so that they are easily manipulated during mower operation while the user remains supported at his/her hands by bar 10. Also, elements 105, 111, 103, and 104 are positioned so that they do not interfere with the operators manipulation of levers 17 and 19 during mower operation. Because levers 17 and 19 are rigidly affixed to one another in a non-pivotal manner, and pivot together as a unit about axis 21, 71, either lever can be used for forwardly or rearwardly controlling a drive wheel, although preferably the operator uses levers 17 for reverse control and levers 19 for forward control due to the convenient location of support bar 10 for supporting the operator's hands during operation.

FIG. 7 is a perspective view of an automatic neutral control return system according to an embodiment of this invention, which functions to bias pump control levers 49, 51 and levers 17 and 19 into their neutral positions when levers 17 and 19 are not being manipulated by an operator. The FIG. 7 system may be used either separately from, or in conjunction with, the system of FIGS. 3–5 described above. As shown in FIG. 7, the system includes rotatable bar 63, steering control levers 17 and 19, rod pivot bars 73, steering control rods 75, and mounted on engine deck 3 are hydro pump 31, hydro pump 33, pump control levers 49 and 51 respectively described above, neutral levers 121 (one corresponding to each pump control lever), substantially U-shaped coupling levers 123 which each operatively couples one of the neutral levers 121 to a pump control lever 49, 51, neutral adjustment base member 125 upon which are mounted a pair of neutral adjustment knobs 127, and biasing springs 129, 131, 133, and 135. Eye bolts 137 are also provided in order to mount the various springs 129–135 to brackets 139 which are rigidly welded of otherwise affixed to supports 15 or some other part of the mower. Eye bolts 139 may be utilized to adjust the tension of springs 129–135. Pin 122 is welded to element 123 that is adjacent pump 31, and pin 122 extends through aperture in each of elements 121, base 132, and pipe bushings 120. Pin or rod 122 is not attached to member 123 that is adjacent pump 33. Each neutral lever 121 pivots on pivot rod or pin 122 so that the biasing force created upon levers 121 by springs 133 and 135 biases levers 121 about their pivot axes in a counterclockwise direction (relative to the FIG. 7 illustration) and the bottom engaging portions 124 of neutral levers 121 come into engaging contact with the engaging ends of neutral adjustment knobs 127. Each knob 127 includes both a hand-manipulatable end which may be turned by an operator in order to adjust the position of the knobs relative to lever 121 surfaces 124, and an engaging end adapted to come into supporting contact with surfaces 124. Knobs 127 may be threadedly adjustable in certain embodiments of this invention. Thus, springs 133 and 135 tend to bias levers 121 to pivot counterclockwise about axes 122 so that engaging members 128 cause coupling levers 123 to pivot counterclockwise about their respective axes 130. Pivot support bases 132 are rigidly bolted to the engine deck, and coupling levers 123 are rigidly affixed (e.g. welded) to pump control levers 49, 51 so that they move together as a unit. One end of springs 133 and 135 is coupled to the engine deck while the other end of each spring is affixed to one of neutral levers 121 in order to normally bias levers 121 and 49, 51 in counterclockwise directions.

Still referring to FIG. 7, springs 133 and 135 bias levers 121, members 123, and pump control levers 49, 51 in one direction (i.e. counterclockwise direction). Meanwhile, springs 129 and 131 bias their corresponding levers 49, 51 in the opposite direction (i.e. clockwise rotational bias about their axes). When springs 129–135 are properly adjusted relative to one another via eye bolts 137 and knobs 127 are properly adjusted, the springs bias levers 49, 51 (and levers 17, 19) into neutral positions so that when-no operator is touching levers 17, 19 then springs 129, 131, 133, and 135 bias levers 49 and 51 such that pumps 31 and 33 are in neutral and wheels 7 are not driven.

Figure 9:
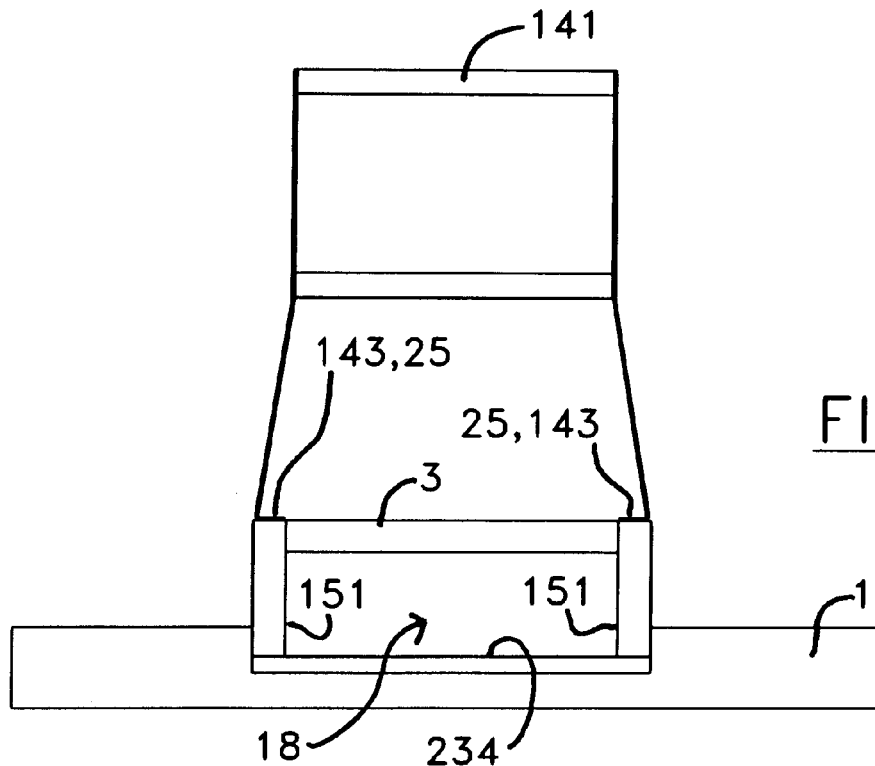
FIG. 9 is a rear elevational view of the FIG. 8 structure, except that the rear wheel assembly and handle bar(s) and dash are not illustrated.
Figure 8:
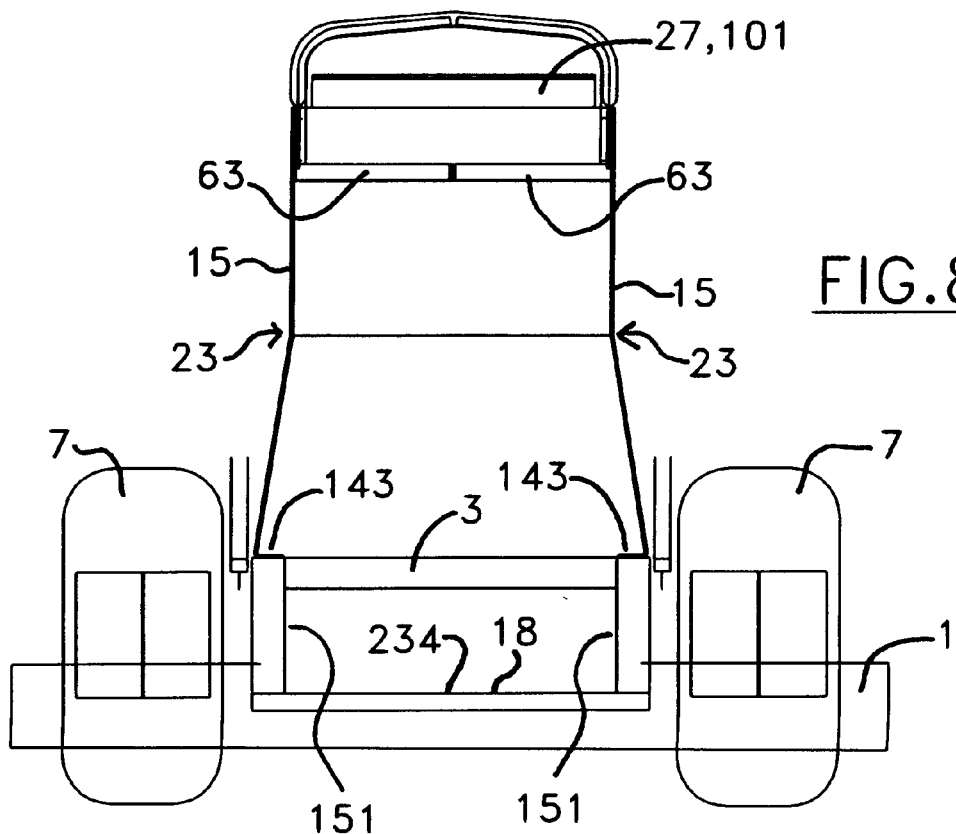
FIG. 8 is a rear elevational view of the handle mechanism assembly supporting structure of the FIG. 1 mower, according to an embodiment of this invention, this structure adapted to be used in conjunction with the mower of FIGS. 1–7 and all embodiments herein.

FIGS. 8 and 9 illustrate the handle bar support assembly from the rear of the mower. The assembly includes sheet metal supports 15 on either side of the mower, central bends 23 in supports 15, dash panel 27, 101, pivots 63 disposed between the opposing supports 15, bend sections 143 at the bottom areas of supports 15 for bolting supports 15 to the engine deck, cutter deck 1, operator foot platform 18, rear drive wheels 7, cross member 141, and engine deck 3. The use of a single piece of sheet metal for each member 15, bent at areas 23 and 143, has been found to greatly improve the manufacturability of the mower. A flat piece of sheet metal is first cut into a shape so as to form a support 15 as shown in FIGS. 1–2. Then, the sheet metal is bent about line 23 and another line so as to form portion 25, 143. In such a manner, only one piece of sheet metal is required, so as to more efficiently enable the mower to be manufactured and to provide a high quality sturdy mower structure.

Referring to FIGS. 2 and 8–9, supports 15 are shaped as shown for specific functional and structural reasons. The base of each member 15 curves backward via radius 2 defined in the rear edge wall of each member 15 for added strength and support for the steering assembly 21. The portions of supports 15 located vertically above bends 23 are substantially parallel to one another so that it is easier to mount the cross members and handle assembly components to the supports 15 and so axis 21 and members 63 can fit through typical straight apertures defined in members 15, and so that pad 13 can be rectangular in design instead of some abnormal shape. The substantially parallel orientation of the supports relative to one another above bends 23 makes it easier for the manufacturer of the mower to tie components into one another above bends 23. Supports 15 are curved and bent below bends 23 as illustrated in order to proved added strength to the supports, and to strengthen the supports against flexing back and forth during operation. Radius 2 in the back edge of each member 15 also provides for additional mower component space behind supports 15 (e.g. hoses and the like). The shape of the supports 15, and their angle upward (from about 15–35 degrees from the vertical) also allows pad 13 position to be maximized for the size of the handle bars, and it is noted that supports 15 get narrower as they near the tops thereof for support/strength reasons.

FIG. 10 illustrates standing platform supporting structure (except for operator support sheet 234) shown generally by reference numeral 18, and engine deck 3 structure, according to an embodiment of this invention. The platform 234 supporting structure 18 includes foot platform sheet 234 for supporting the operator's feet (not shown in FIG. 10) during mower operation, platform sidewalls 151 for isolating the operator's feet from the drive wheels 7 and their motors, vertical surface 153, elongated annular bar 155 welded to the platform structure so as to give structure for wheel motor brackets 157 on both sides of the platform, a pair of motor brackets 157, rigid channel shaped member 159 disposed between sidewalls 151 and proximate the front of foot area for providing structure for brackets 157 and a rest 160 for the front of the standing platform, handlebar upright base members 163 including vertically oriented portions and horizontally aligned portions 161 the substantially horizontally aligned portions 161 for supporting members 15 which may be bolted or welded thereto via holes 165. In FIG. 10, a void or open area is defined between bar 155, the sidewalls, and member 159, this void area to be filled by operator support sheet 234 when the sheet is pivotally mounted via apertures 171 defined in the sidewalls. Operator supporting plate or sheet 234 is not mounted to the engine deck 3, but instead is pivotally mounted to sidewall members 151 via apertures 171—this is important as it would be undesirable for the plate 234 to be mounted to the engine deck. The entire purpose of sidewalls 151, bar 155, etc. is to enable operator supporting platform plate 234 to be pivotally mounted beneath the engine deck, and not to the engine deck. This is believed to improve mower performance.

Rigid strong members 161, 163 are important in that they simultaneously provided mounting support for support members 15, motor brackets 157, platform 18, and sidewalls 151. One metal sheet is provided and bent so as to form engine deck surface 3, vertical surface 153, and sidewalls 151. Thereafter, this single bent metal piece is welded or otherwise rigidly affixed to bent beam supporting members 161, 163 in order to provide ample support for platform 234, brackets 157, and supports 15. Supports 15 are mounted to members 161, 163 via substantially horizontally aligned support surface 164 and mounting holes 165. The mower is designed so that each member 161, 163 may be identical in manufacture with regard to shape regardless of what side of the mower the piece ends up on, thereby simplifying the manufacturing process for the mower. Also, each member 161, 163 includes a support tab 167 bent therefrom for providing rigidity and support to the handlebar mounting surfaces 164. Mounting holes 169 are provided on each sidewall 151 for enabling wheel motor brackets 157 to be affixed to the sidewalls. Numerous holes 169 are provided so that the mounting position of brackets 157 can be adjusted along with the vertical position of the front caster wheels so as to adjust the height of the cutter deck and thus the cut of the mower. Pivot hole 171 is provided in certain embodiments in each sidewall 151 for the purpose of pivotally mounting a thin pivotal sheet portion 234 (see FIG. 16) within the FIG. 10 structure which is operatively associated with a deadman switch so that the mower is automatically stopped or turned off when the operator steps off of sheet 234 (e.g. metal sheet), the front of this platform sheet 234 resting on portion 160.

Figure 11:
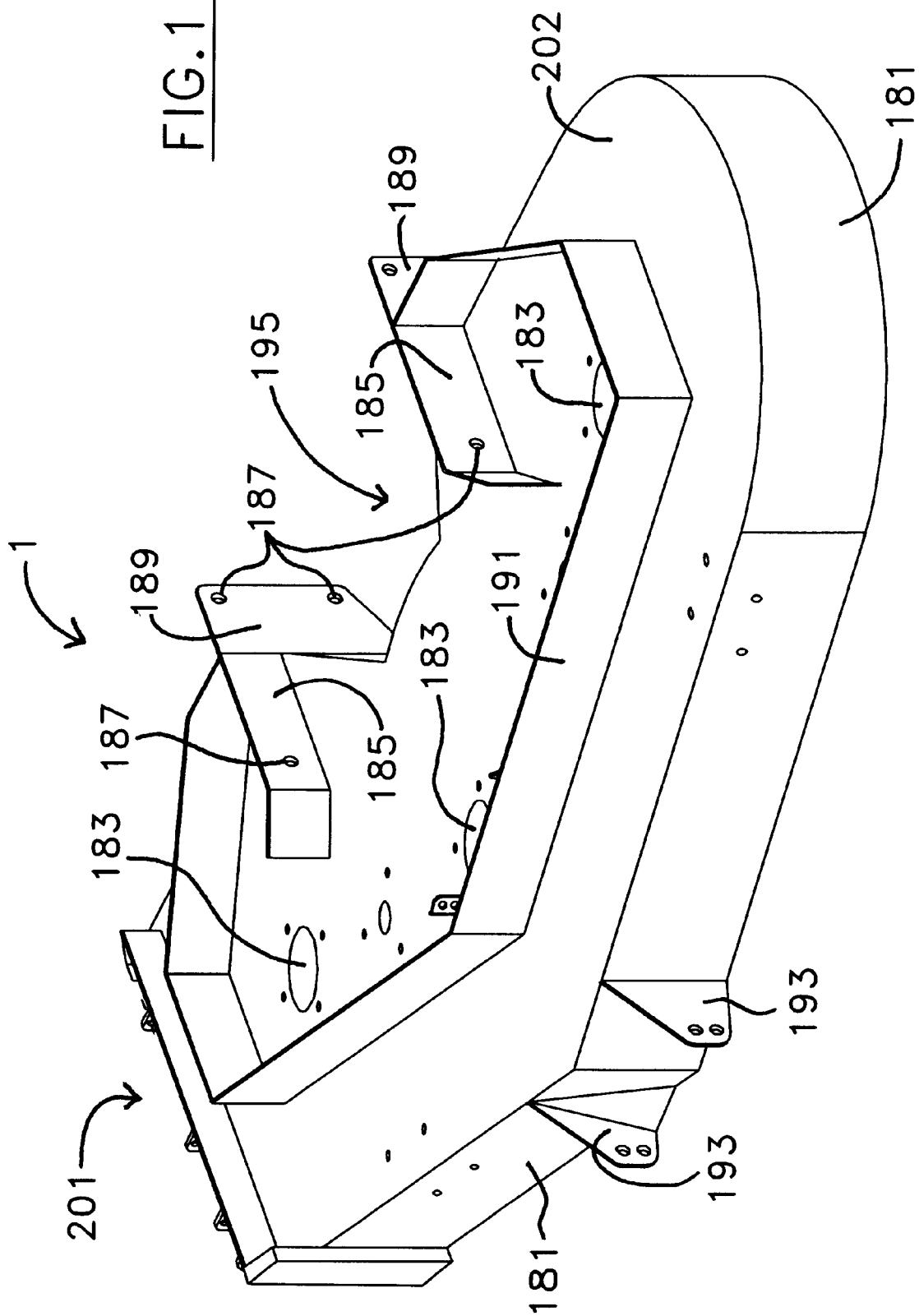
FIG. 11 is a perspective view of the cutter deck according to an embodiment of this invention, this cutter deck adapted to be used in conjunction with the mower of FIGS. 1–10 and all embodiments herein.
Figure 12:
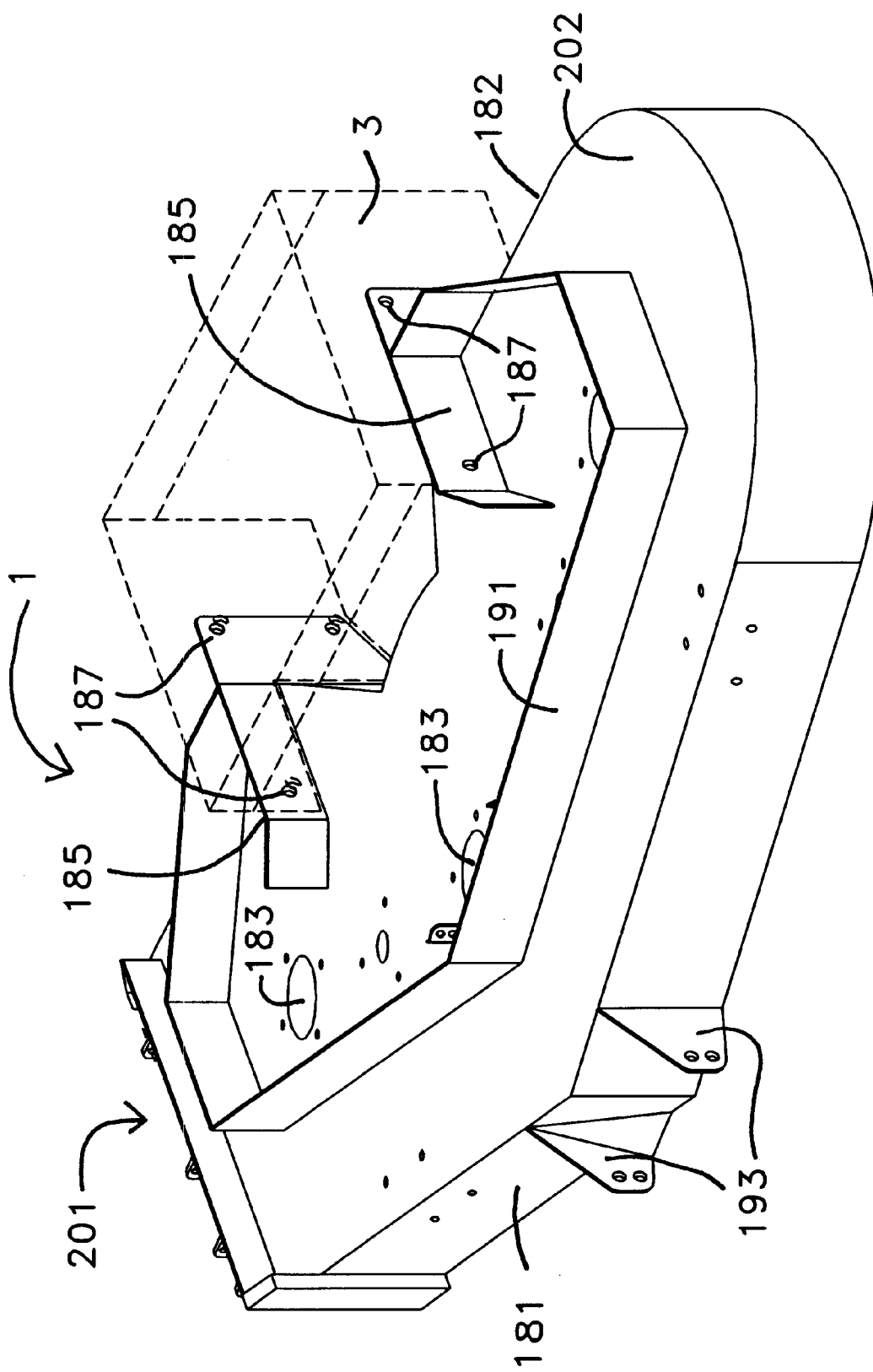
FIG. 12 is a perspective view of the FIG. 11 cutter deck, and in addition to FIG. 11 illustrates how the cutter deck may be attached to the separate and independent engine deck, the engine deck being illustrated in dotted lines.

FIGS. 11 and 12 illustrate cutting deck 1 below which the grass cutting blade is rotatably mounted. FIG. 12 shows cutting deck 1 mounted to engine deck 3, with the engine deck in dotted lines. Cutting deck includes side substantially vertically oriented edge wall 181 which is continuous all the way around the cutting deck 1 except for at the grass throwing opening, apertures 183 through which pulley members protrude to a position beneath the deck in order to drive the blades, vertically oriented supporting walls 185 for mounting deck 1 to engine deck 3 via holes 187 which have axes that are horizontally oriented, vertically extending supporting wall portions 189, front cover supporting wall 191, anti-scalp roller supporting members 193, and recess 195 within which engine deck 3 fits and is mounted and allows the clutch to be removed from the engine for easy maintenance.

FIG. 13 is a top view of cutter deck 1 as if the top surface thereof was transparent, further illustrating walls 197 which define the three different cutting cavities occupied by the three different blades (e.g. reference numeral 184) under the deck. FIG. 14 is a top view of cutter deck 1, with each of FIGS. 13 and 14 showing the deck 1 of FIGS. 11–12.

FIG. 15 shows the grass-throwing opening 201 in cutter deck 1, with grass discharge opening 201 being defined in one side of the cutter deck. The top surface 202 of cutter deck 1 is formed along with frontwall 181 out of a single piece of sheet metal that is bent as illustrated so as to define opening 201 therein. Walls 182 and 206 are also formed of a single metal sheet piece. Also provided on cutter deck 1 adjacent discharge opening 201 are support bar member 203 for stiffening and providing support for the opening 201, bar 203 including an elongated portion extending substantially from front wall 181 to rear wall 182 of the cutter deck, and rear slot portion 204 bent from bar 203 for providing a slot or pocket for a catcher pin, and support member 205 attached to front wall 181 for supporting bar 203. Elongated supporting member 205 strengthens the front of the cutter deck, and is welded to 203. Also, wall portion 206 is formed of the same piece of metal used to form rear wall 182 with inner wall 206 being bent inwardly into opening 201 so as to angle the cut grass into the grass catcher, and to provide support for the catcher and the upper surface 202. Wall 206 is supported at its rear edge by wall 197 which is either welded thereto or formed integrally therewith so that wall 206 is resistant to bending and the like when it should hit stones or the like during mowing. Additional support 207 may be provided adjacent the front of opening 201 adjacent front wall 181 in order to prevent wall 181 from bending or the like upon hitting curbs, trees, or stones during mowing, with support 207 being positioned adjacent wall 181 between upper wall 202 and lower bent portion 208. Elements 197, 206, and 182 are baffles/walls which form a substantially triangular support structure in order to strengthen and support the skirt of the deck that is exposed by opening 201.

Figure 31:
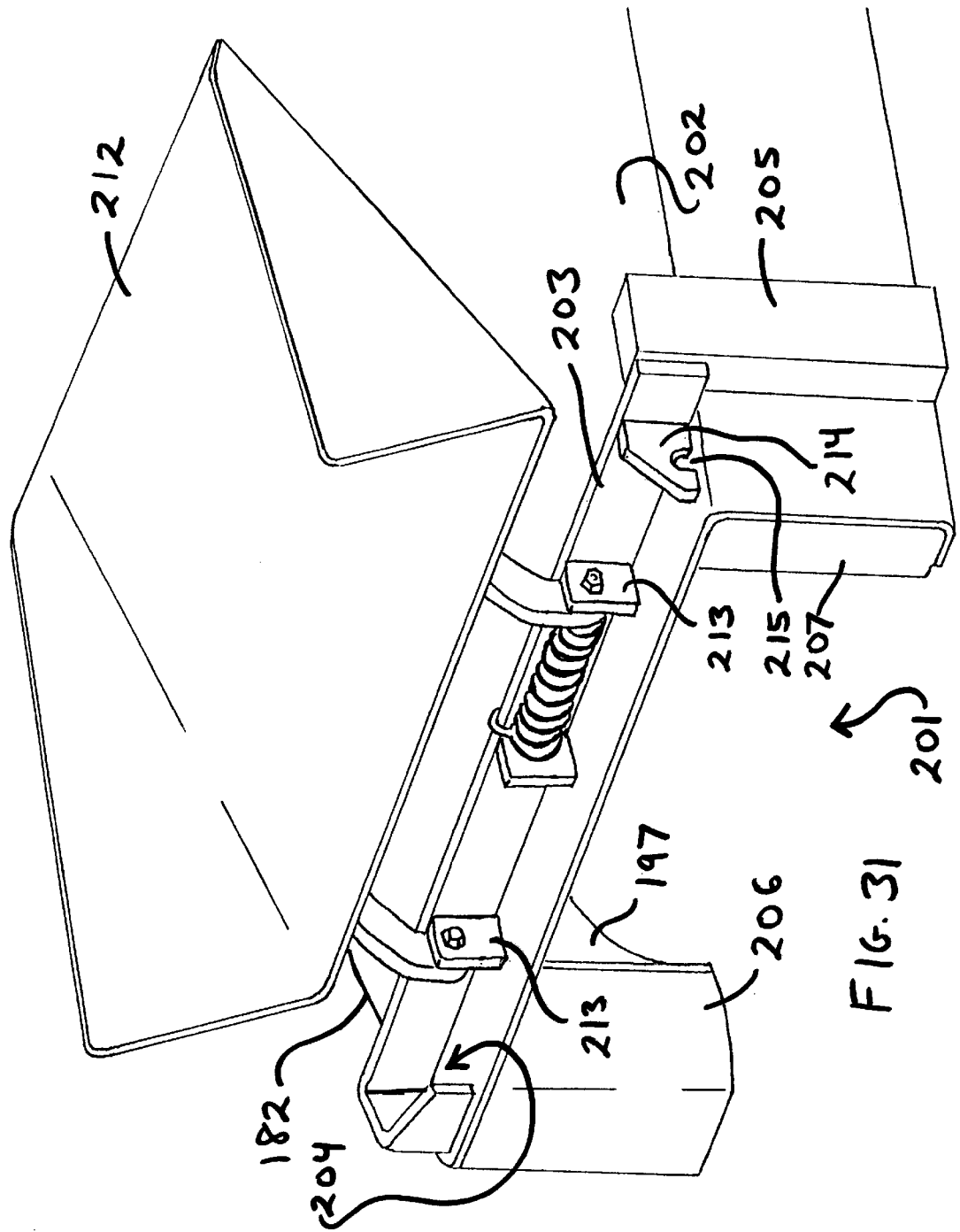
FIG. 31 is a perspective view of the FIG. 15 cutter deck side-grass-discharge opening, with a grass deflector pivotally attached thereto according to certain embodiments of this invention.
Figure 32:
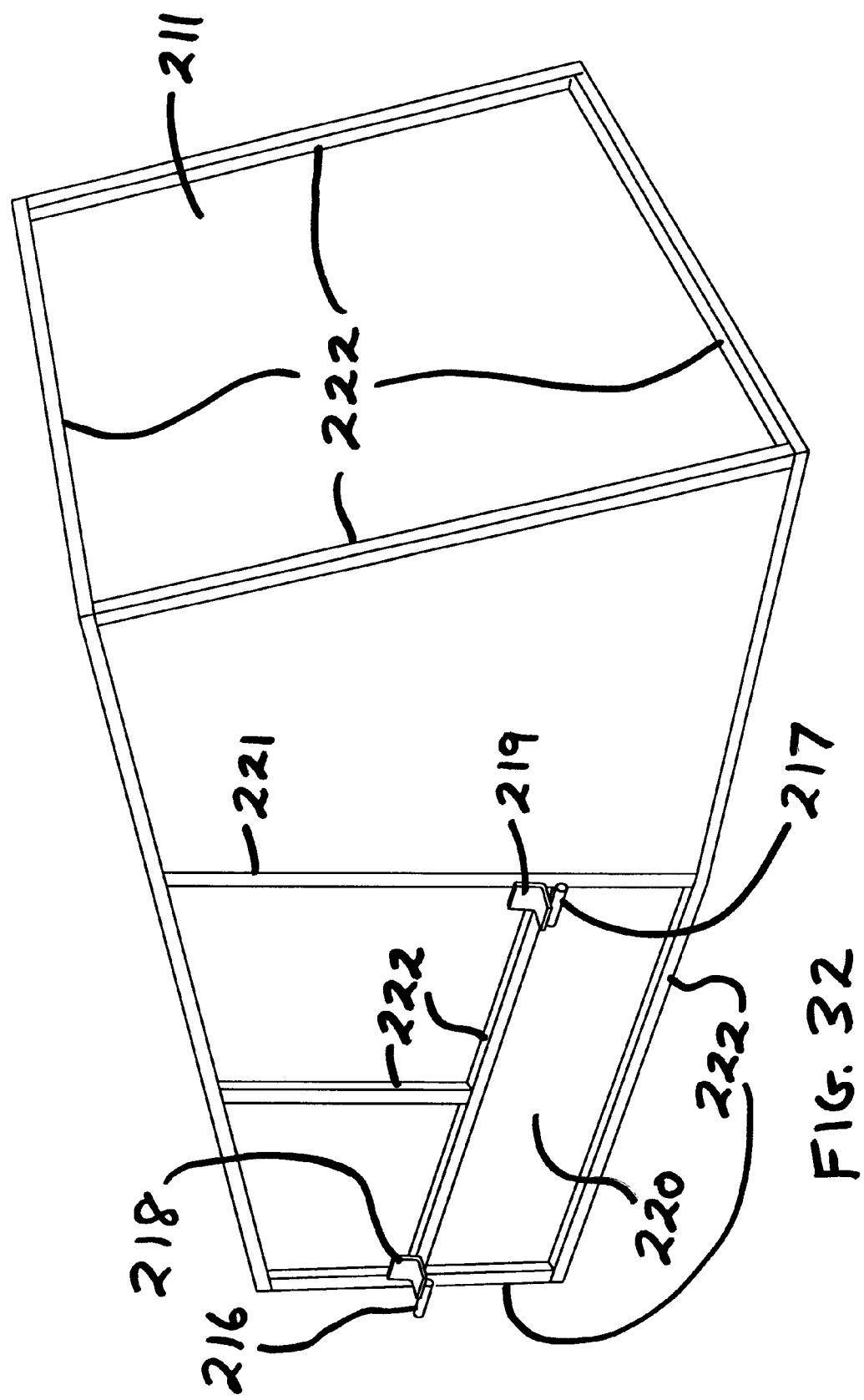
FIG. 32 is a perspective view of a grass catcher adapted to be attached to the cutter deck structure shown in FIGS. 15 and 31 according to certain embodiments of this invention.
Figure 33:
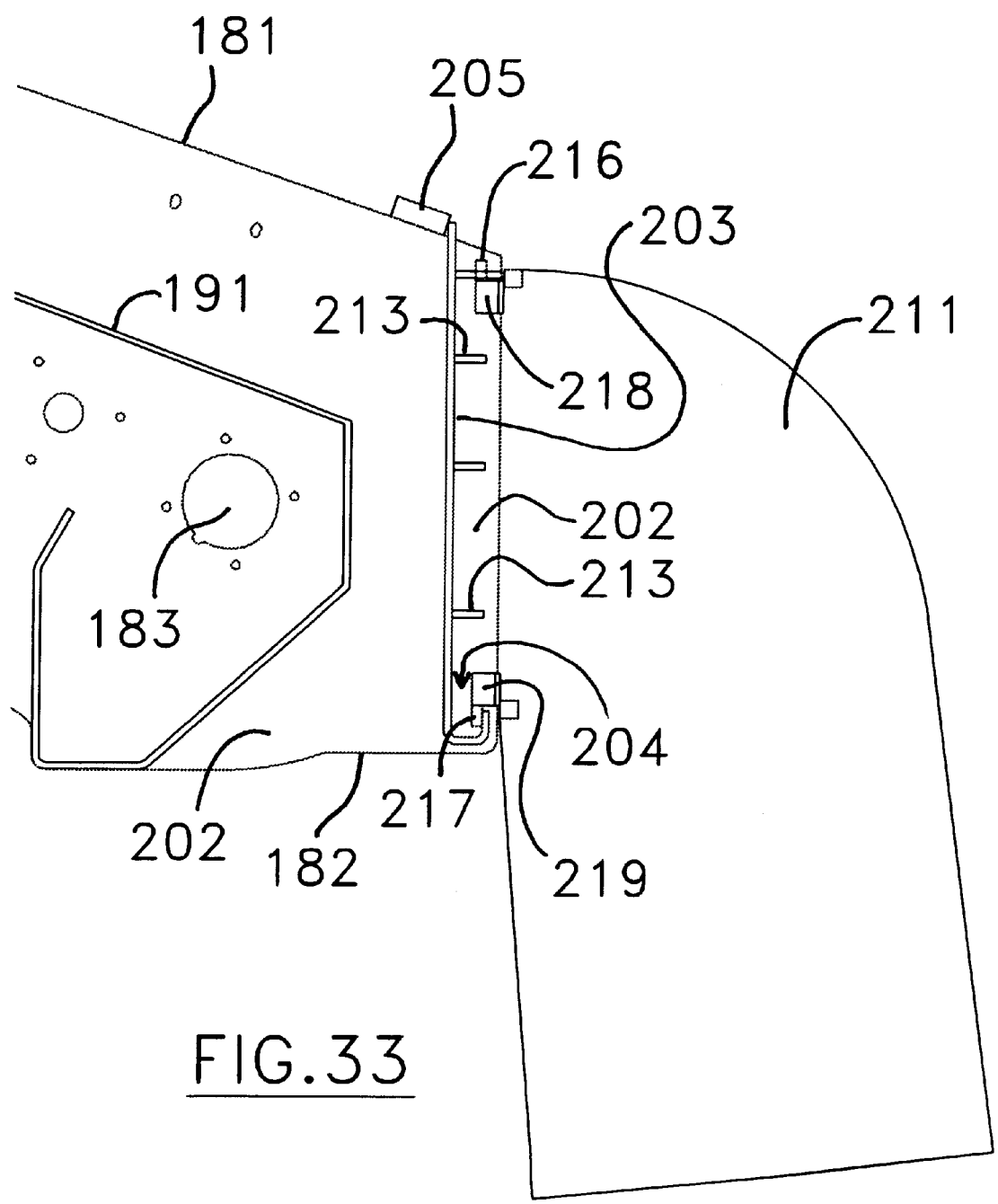
FIG. 33 is a top elevational view of the FIG. 32 grass catcher attached to the FIG. 31 cutter deck according to certain embodiments of this invention, this catcher assembly adapted to be used in conjunction with all mower embodiments herein.

FIGS. 31–33 show grass catcher 211 pivotally attached to the cutter deck opening 201 of FIG. 15. FIG. 31 shows additional catcher bracket structure including grass chute deflector 212 pivotally attached to support 203 via support tabs 213 in a manner such that deflector 212 does not have to be removed from cutter deck 3 in order to attach a grass catcher thereto. Front support tab 214 is welded or otherwise affixed to support 203 and the upper surface 202 of cutter deck 1, with tab 214 including notch or aperture 215 defined therein for receiving pin 216 that is rigidly mounted to the front of catcher 211. Rear slot 204 receives rear catcher pin 217 which simply may drop into slot 204 when catcher 211 is pivotally attached to the cutter deck 1. Referring still to FIGS. 32–33, substantially L-shaped metal rigid members 218 and 219 are welded or otherwise rigidly affixed to catcher 211 for supporting pins 216 and 217 respectively, with the pins being welded to members 218 and 219 in certain embodiments, although other types of attachment will also suffice. Catcher 211 includes opening 220 defined therein which is aligned with deck opening 201 when the catcher is attached to the mower so that grass will be blown or thrown from underneath the cutter deck outwardly through opening 201 and into catcher 211 via catcher opening 220. Catcher frame support bar 221 is provided at the rear of catcher opening 220 in order to define and support opening 220, and member 219 is welded to bar 221 in certain embodiments. Additional elongated frame members 222 are provided for catcher 211 in order to define opening 220 and the catcher's shape, as well as to form a mounting support for the screen or cloth which closes off the catcher to hold cut grass.

Figure 16:
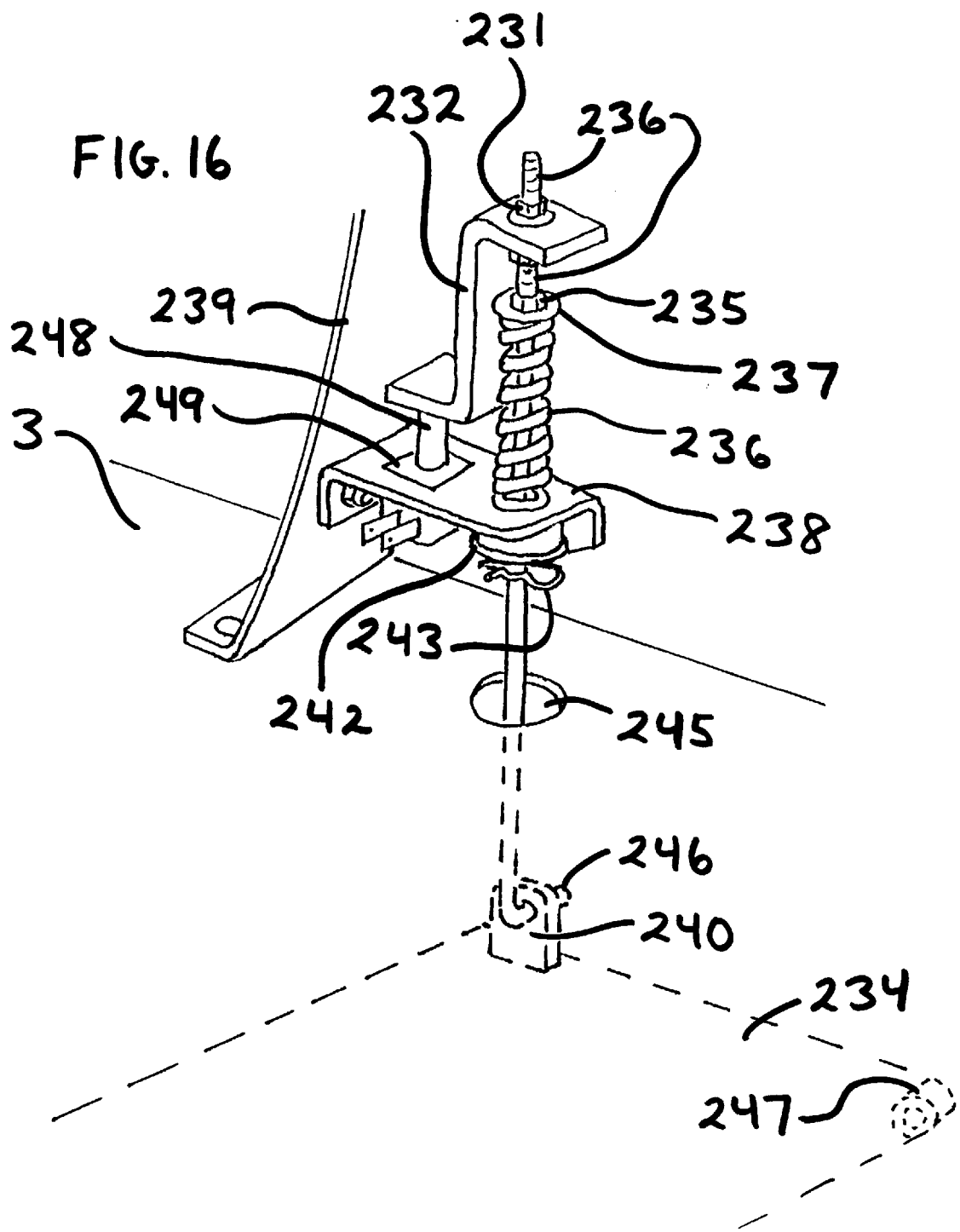
FIG. 16 is a perspective view illustrating certain components of a deadman switch operatively associated with the operator support platform, this structure to be used in conjunction with the mower of FIGS. 1–15 and all embodiments herein.

FIG. 16 illustrates part of the deadman switch operatively associated with the foot platform 18 in a manner such that when the operator steps off of the platform the deadman switch causes the mower blades to shut down or the mower to turn off. Preferably, the engine is cut off and the cutting blades stopped when the switch is actuated. The switch structure includes flange nut 231 tightened against the upper surface of Z-shaped member 232, substantially z-shaped member 232 whose position is adjustable relative to rod 233, rod 233 which is pulled down when the operator steps on platform sheet 234 which is pivotally mounted in holes 171 (see FIG. 10), nut 235 for adjusting the tension of spring 236 via threads 236, washer 237 disposed between nut 235 and spring 236, compression spring 236 for biasing/lifting platform sheet 234 upward off of the FIG. 10 surface 18 when the operator steps off of the sheet and mower, base member 238 which is affixed (e.g. bolted) to gas tank support 239 (when base 238 is unbolted from 239 and rod 233 is disengaged from tab 240, the subassembly is easy to work with from a maintenance point of view), rubber washer 241 (e.g. ¼" thick) acts as a bumper stop against member 238 when the operator steps off of platform to prevent platform bouncing or oscillation, fender washer 242 which backs up washer 241, R-clip 243 which fits through a hold in rod 233 and holds washers 241–242 from sliding down the rod, engine deck 3, aperture 245 defined in the engine deck so that rod 233 can pass therethrough, and wherein rod 233 is threaded at one end thereof and bent 246 at the other end so as to fit through an aperture in tab 240, with an R-clip being preferably through a hole in the end of rod 233 adjacent tab 246 to prevent the rod 233 from slipping out of the tab 240. Rod 233 is pivotally attached to tab 240. Platform sheet 234 is pivotally attached to the FIG. 10 structure via 247. The FIG. 16 structure further includes switch plunger 248 and corresponding electric switch 249 which clips into member 238.

The FIG. 16 deadman switch works as follows. When the operator is standing on platform 18 and on platform sheet 234, the sheet 234 is pivoted downward about pivot 247 under the weight of the operator, and the mower may be run or operating. However, when the operator steps off of sheet 234 of platform structure 18 when the clutch switch is on, then spring 236 biases sheet 234 upward along with rod 233 and member 232 [if the clutch switch is off, then the deadman switch may do nothing in certain embodiments of this invention]. When member 232 and rod 233 are biased upward in such a manner, switch 249 is actuated which in turn causes the mower's engine and/or blades to stop.

FIGS. 17 and 23–26 show a pump 31, 33 clamp and lever assembly according to certain embodiments of this invention. This system may be used either separate from the systems of FIGS. 3–7, or in conjunction therewith on mowers herein. For example, linkage member 251 may be the bottom portion of a lever 123 in the FIG. 7 system.

Referring to FIGS. 17 and 23–26, the pump control clamp and lever assembly includes linkage member 251, 123 which may be pivoted about an axis defined by shaft/rod 253 when levers 17 and 19 are manipulated by the operator, clamp 255 (FIG. 23 shows clamp 255 before it is bent and FIG. 17 after it is bent), bolts 256 and 257 which pass through the opening or cavity defined by the two portions of bent clamp 255 (no welding is needed), and pump shaft 253 for controlling the speed and direction of hydro (hydraulic/hydrostatic) motors via pump 31, 33. One of the illustrated assemblies may be provided for each pump 31, 33.

Control linkage 251 bolts to clamp 255 and acts as a lever operatively coupled to rod(s) 75 and shaft(s) 253 for controlling the pump(s) 31, 33. Bolt 256 extends through both clamp 255 and through an aperture defined in linkage 251 so as to fixedly couple linkage 251 to clamp 255 on shaft 253. Bolt 256 is larger than bolt 257 for strength reasons. Bolt 257 passes through linkage 251, clamp 255, and an aperture 261 in shaft 253 in order to fixedly couple the linkage to shaft 253 so that shaft 253 pivots and controls the pump at issue when linkage 251 pivots. Elongated coupling member 257 (e.g. bolt, screw, pin, or the like) also helps keep clamp 255 from rotating on shaft 253 if the flat 262 on shaft 253 (which is part of the pump) were to strip for some reason. Member 257 also positions the clamp along the shaft 253, as member 257 extends through the aperture 261 in the shaft and in between the clamp walls to prevent the clamp from sliding off of the shaft 253. Member 257 also helps couple shaft 253 to clamp 255 which includes aperture 263 defined therein in a shape adapted to match and receive the flat 262 end portion of shaft 253. Flat washer 265 bridges across the gap in the bottom of clamp 255 so that nut 266 can tighten washer 265 against clamp 255 without falling or slipping between the sidewalls of the clamp. Nut 266 may be of the Nylon locking type in certain embodiments, as may nut 267. Nut 267 is larger than nut 266 so that it will not slip into the gap between the sidewalls of clamp 255 (no washer is used adjacent nut 267 in certain embodiments). The clamping and lever assembly set forth above is unique in that is provides and efficient and simple way in which to allow linkage 251 to control pumps 31, 33, the system not having breakdown problems and being easy to assemble, and little if any welding is needed. In operation, when linkage 251 pivots, shaft 253 which is connected into a pump 31, 33 pivots with it so that the pump may be controlled which in turn controls the direction and speed of the drive wheel(s) 7. Pump shaft 253 controls the speed and direction of the hydro motors (one motor is located in each bracket 157 for driving a rear drive wheel), and in preferred embodiments shaft 253 is actually part of each pump 31, 33.

FIGS. 18–20 show an anti-wheelie assembly for use in mowers herein, this assembly for preventing the popping of severe wheelies (flipping over of the mower backward) by the mower during operation. FIG. 18 generally illustrates the FIG. 10 structure and in addition thereto an anti-wheelie wheel 271 on each side of the rear of the mower, a pair of wheel 271 supporting structures each including a shoulder bolt 273 which tightens the wheel securely on the mower but allows wheel 271 to turn, support 275 which maintains plate 276 rigid and keeps it from bending and deflects the operator's shoes when he/she steps off of the mower so that they do not get hung up on nut 277, plate 276 for supporting and mounting a wheel 271, wherein each plate 276 including three different apertures 278 therein for allowing adjustment of wheel 271 position.

FIG. 19 shows the FIG. 18 mower backed up against curb 280, and that the FIG. 18 anti-wheelie structure wheels 271 are positioned high enough relative to the ground so that wheels 7 will hit typical curbs prior to anti-wheelie wheels 271 hitting a curb thereby lengthening the lifespan of the anti-wheelie structure. Wheels 271 are also high enough to miss curbs so as to allow tires/wheels 7 to climb over curbs.

FIG. 20 shows how the anti-wheelie structure of FIGS. 18–19 prevent the mower from tipping/flipping over backwards during operation. As shown, because of wheels 271, if the mower should tip backward or pop a wheelie, wheels 271 contact the ground as the mower lifts off the ground at the front thereof thereby preventing the mower from flipping over backward. The more weight that is put on wheels 271, the more wheels 7 loose traction. The height of wheels 271 may be adjusted by the operator so as to prevent wheelies at predetermined angles of tipping. Anti-wheelie wheels are set in the hole(s) corresponding to the height of the drive wheels, which are also adjustable on the engine deck [the anti-wheelie wheels are always the same distance from the ground during certain embodiment]. Thus, when one adjusts the position of the drive wheels on the engine deck, the vertical location of the anti-wheelie wheels is adjusted so that the anti-wheelie wheels always remain substantially the same distance from the ground so that the wheels 7 can climb over curbs and the like. Also, the exact angle at which wheels 271 first touch the ground to prevent tipping can be adjusted by altering the height of wheels 271 via holes 278. Also, you do not want wheels 271 located too far from the ground so that line 281 does not become too close to the vertical. Another advantage to wheels 271 as opposed to a bar or the like, is that wheels 271 cannot dig into the ground thereby functioning is a superior manner to prevent tipping.

In FIG. 20, the balance point 281 of the mower is shown. Line or axis 281 is the line to the right of which the majority of the mower's weight is located when wheels 271 become engaged with the ground. Line 281 could also be said to be the balance point on wheels 271. It is important that the majority of the weight of the mower stay forward of line 281 to prevent tipping. Because the majority of the mower's weight cannot pass beyond axis or point 281, the mower tips back forward. Axis 281 may be designed so as to be angled forward of a vertical line on most terrain, by an angle of from about 45–80 degrees. Thus, backward tipping is prevented.

FIGS. 21 show a fuel tank support structure useable with embodiments herein. FIG. 22 shows a support leg of FIG. 21 that may be used either as a fuel tank support or as a support for supporting a battery mounting plate. The same support legs 290 may be used as both a battery support and a fuel tank support. Included are support bracket 290, a radius 292 defined in an edge side of bracket 290 near the path 299 of the deflector 212 when pivoted, radius 293 in the other side/edge of bracket 290 for allowing room for various engines and the like, mounting apertures 294 defined in bracket 290 for oil filter mounting, mounting holes 295 in bracket 290 for platform switch base, base portion 296 of bracket 290 (FIG. 22 shows portion 296 prior to bending and FIG. 21 after bending for affixing to the flat surface of engine deck), chute deflector 298, 212, and its path 299 avoiding bracket 290. Reference numeral 300 illustrates approximate engine 9 placement showing the need for radius 293.

Notch 301 in an upper edge of bracket 290 is adapted to received a strap in certain embodiments, when the FIG. 22 structure is used for battery support.

As shown in FIG. 21 for fuel tank support, two brackets 290 are mounted on the engine deck, and are coupled together by, and support, fuel tank platform 302 upon which the fuel tank is placed during mower operation.

Figure 27:
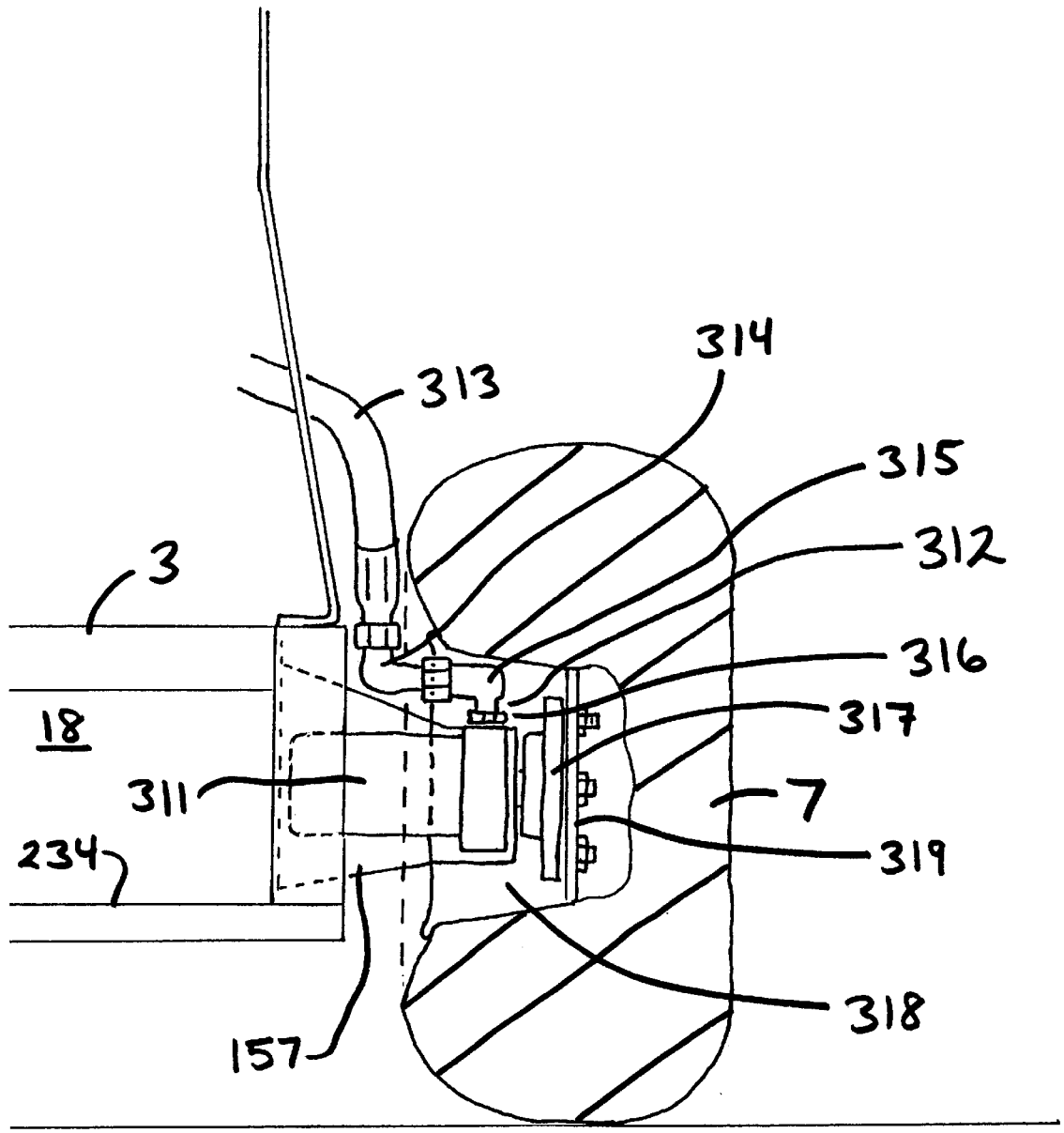
FIG. 27 is a rear elevational view, with the tire being illustrated in cross-section, of the right rear side of a mower in accordance with an embodiment of this invention, this particular embodiment or system for enlarging the standing area for the operator between the rear drive wheels, this structure useable in accordance with any of the embodiments herein.

FIG. 27 illustrates an embodiment of this invention for expanding the standing/foot area for the operator proximate platform 234. Illustrated for only one of the two drive wheels (there are two of course each including everything illustrated) are hydro wheel motor 311 with front fluid ports 312, wheel motor bracket 157, two hydraulic hoses 313 (one behind the other), hydraulic fitting elbows 314 (one hidden), hydraulic fitting elbows 315 fitted into motor 311 (one hidden), threaded port 316, wheel mounting hub 317, tire for wheel 7, wheel rim 318 with centered spider (or alternatively with the spider offset out further), engine deck 3, wheel spider 319 supports outer rim and for mounting the wheel onto the hub, and operator standing area 18. As shown, the illustrate inventive wheel structure adjacent the standing area on the mower enables the wheel motor 311, and hub 317 to be positioned between the sidewalls 151 and the outer edge of the tires. This conserves space and allows for more operator room between the tires.

Figure 28:
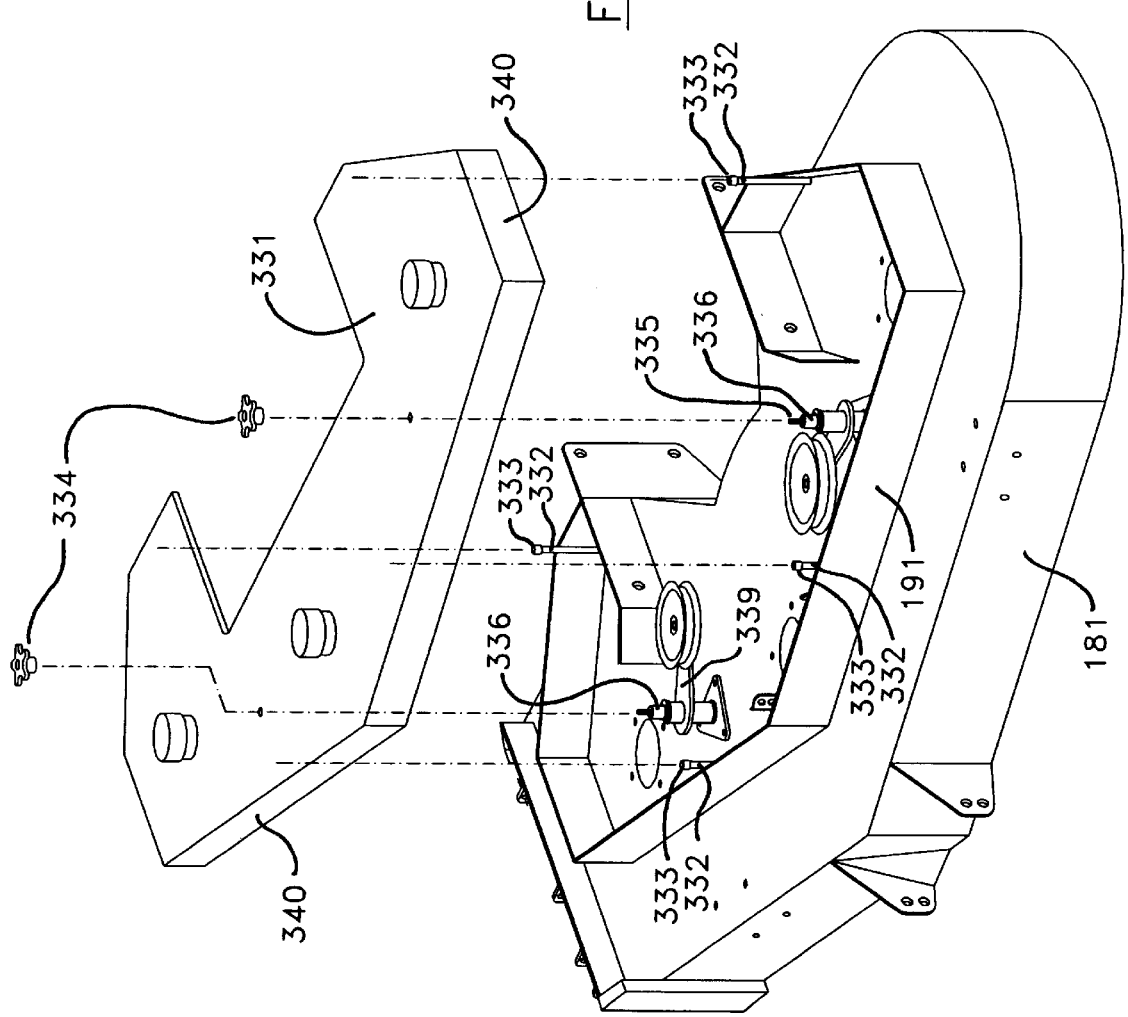
FIG. 28 is a perspective view of the cutter deck of FIGS. 11–14, in conjunction with its deck cover according to an embodiment of this invention.

FIG. 28 shows the cutter deck 1 of FIGS. 11–15, and a deck belt cover 331 for resting thereon. This assembly includes cover 331 which rests on post members 332 and caps 333 when knobs 334 are tightened down. This system is designed so that only two knobs 334 are needed and the system is resistant to rattling (other mowers use many more knobs and/or are susceptible to rattle between the cover and deck). Plastic caps 333 are provided on post members 332 to reduce noise from vibration, as the cover rests upon these caps. Post members 332 may be welded to respective deck support walls 191 as illustrated. Threaded studs 335 are screwed or otherwise attached into idler pivot pin 336 in order to align cover 331 and knobs 334. Idler arms 339 rotate on pins 336. The tops of idler pivot pins 336 are slightly lower in elevation than the tops of caps 333 so that when cover 331 is tightened down via knobs 334 it gives cover 331 more rigidity. Also, it has been found that the system works better when the idler pins 336 are each located proximate a line drawn between a pair of posts 332 on either side of the center of the cutter deck. Another unique feature which improves performance is the fact that the downward extending edge wall 340 of cover 331 is positioned distanced from deck support wall 191 so that a substantial space of gap is defined between wall 191 and wall 340, so that the only rigid or solid elements that the cover contacts (other than the caps) are the tops of pins 336. This reduces rattling, and improves design performance.

Figure 29:
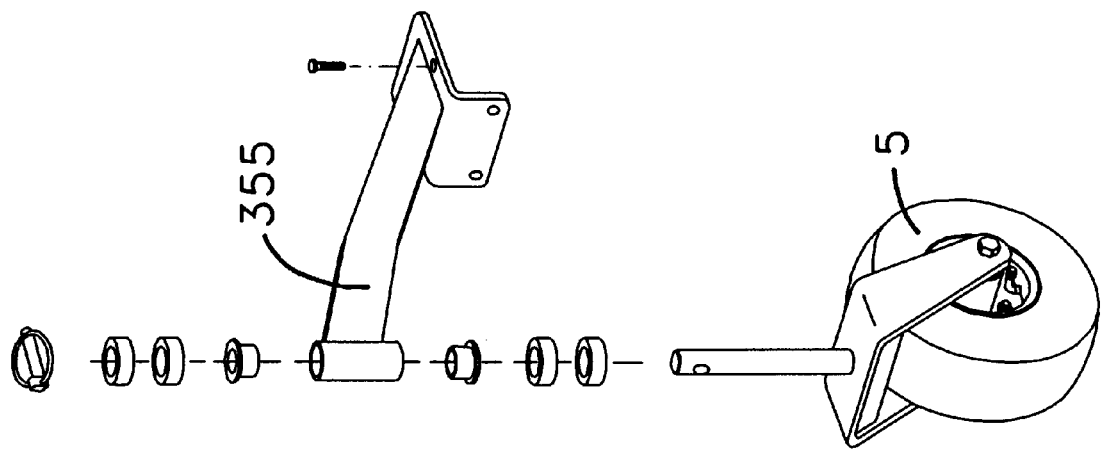
FIG. 29 is an exploded perspective view of the caster structure for each of the front caster wheels of the mowers of this invention, according to certain embodiments.
Figure 30:
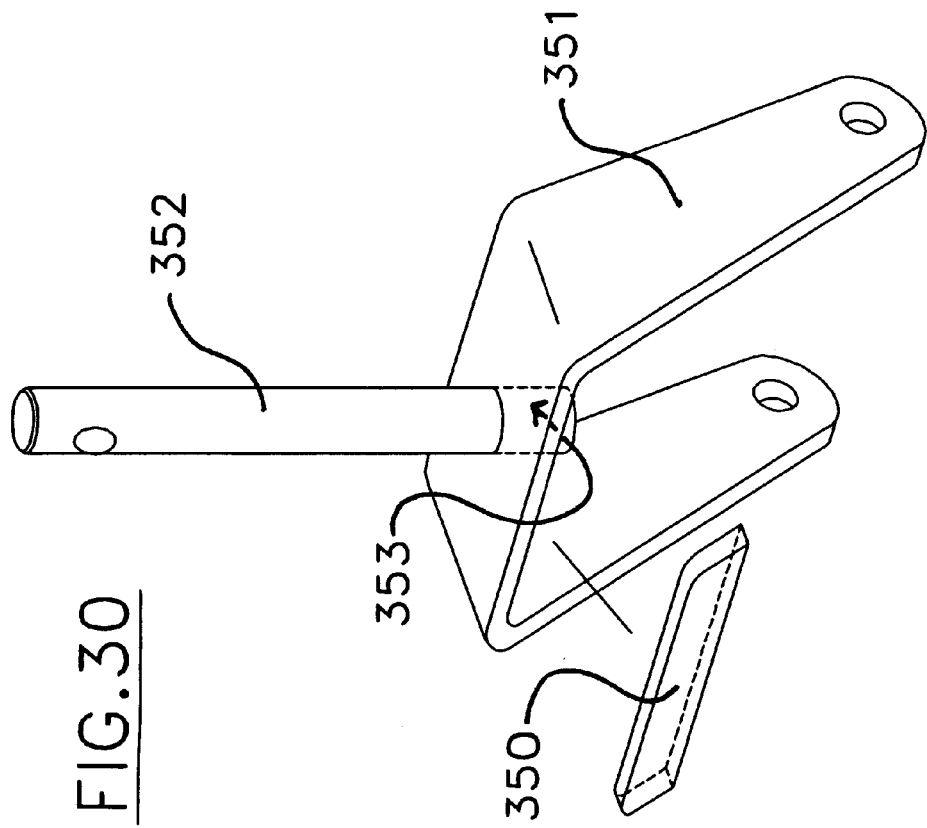
FIG. 30 is an exploded perspective view of the FIG. 29 caster yoke, caster pivot pin, and cross bar, this caster structure adapted to be used for supporting front wheels according to any embodiment of this invention.

FIGS. 29–30 show front caster wheel structure according to certain embodiments of this invention. Shown is only one wheel structure, although two similar ones are provided. The caster structure includes cross bar 350 welded to yoke 351 and pin 352 at 353 under the yoke to strengthen the yoke, yoke 351 to mount and hold the front caster wheel(s) 5, caster pivot pin 352, lower end 353 of pin 352 where the pin is welded to bar 350, caster wheel 5, and caster support member 355. Caster strength and performance is improved by this design. As shown in FIG. 30, pin 352 extends through yoke 351, so that its distal end (shown in dotted lines) is welded to cross member 350 beneath the yoke cross member for added strength and support. Furthermore, it is noted that member 350 must be inserted and welded to pin 352 and yoke 351 on the side shown in order to clear the wheel, due to the angular design of yoke 351.

Once given the above disclosure, various other modifications, features, and/or improvements will become apparent to the skilled artisan. Such other features, modifications, and improvements are thus considered a part of this invention, the scope of which is to be determined by the following claims.

What is claimed is:

1. A cutter deck adapted to be mounted on a power lawn mower, said cutter deck comprising:

a top surface;

a front sidewall connected to said top surface, said front sidewall defining a front section of said cutter deck;

a grass discharge opening defined in a side of said cutter deck, so that cut grass can be discharged from an interior of said cutter deck via said grass discharge opening;

a vertically extending wall located on said top surface, said vertically extending wall defining a first area in which blade driving pulley members are located;

first and second elongated vertically extending cover support members extending upwardly from said top surface to a location above a top edge of said vertically extending wall so as to support a cutter deck cover; and wherein said cover is mounted on said cover support members so as to cover said first area and so that an upper surface of said cover does not directly contact said vertically extending wall, and wherein a sidewall of said cover is at least partially disposed in a spaced substantially parallel relationship from a corresponding portion of said wall so as to define a gap therebetween when said cover is mounted on said cutter deck.

2. The cutter deck of claim 1, wherein said deck includes catcher mounting structure located proximate said discharge opening, said catcher mounting structure including first and second pin receiving members for receiving pins mounted on a grass catcher to be mounted to said cutter deck.

3. The cutter deck of claim 2, wherein said first pin receiving member includes an aperture defined an a metallic member, and said second pin receiving member includes a cavity or slot defined between two substantially parallel members, said catcher mounting structure for enabling the catcher to be pivotally mounted to said cutter deck.

4. A cutter deck adapted to be mounted on a power lawn mower, said cutter deck comprising:

a top surface;

a front sidewall connected to said top surface, said front sidewall defining a front section of said cutter deck;

a grass discharge opening defined in said cutter deck, so that cut grass can be discharged from an interior of said cutter deck via said grass discharge opening;

a vertically extending wall located on said top surface, said vertically extending wall defining a first area within which at least one blade driving pulley member is located;

at least two vertically extending cover support members extending upwardly to respective locations above a top of said vertically extending wall so as to support a cutter deck cover; and wherein said cutter deck cover is supported by said cover support members so as to cover said first area, and wherein said cover is spaced from said vertically extending wall so as to define a gap therebetween when said cover is supported by said cover support members so that said cover is not in direct contact with said vertically extending wall.

* * * * *